United States Patent
Allen-Ware et al.

(10) Patent No.: US 10,088,643 B1
(45) Date of Patent: Oct. 2, 2018

(54) MULTIDIMENSIONAL TORUS SHUFFLE BOX

(71) Applicant: International Business Machines Corporation, Armonk, NY (US)

(72) Inventors: Malcolm S. Allen-Ware, Tucson, AZ (US); Kevin Clarke, Westford, MA (US); John Considine, Hollis, NH (US); Thomas W. Keller, West Lake Hills, TX (US); Daniel M. Kuchta, Patterson, NY (US); David D. Wright, Marlborou, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/635,315

(22) Filed: Jun. 28, 2017

(51) Int. Cl.
*H04L 12/751* (2013.01)
*G02B 6/44* (2006.01)
*G02B 6/38* (2006.01)

(52) U.S. Cl.
CPC ......... *G02B 6/4446* (2013.01); *G02B 6/3885* (2013.01); *G02B 6/3893* (2013.01); *G02B 6/3897* (2013.01)

(58) Field of Classification Search
USPC ........................................................ 385/135
See application file for complete search history.

(56) References Cited

U.S. PATENT DOCUMENTS

| 6,230,252 B1 | 5/2001 | Passint et al. |
| 7,243,142 B2 | 7/2007 | Poirot et al. |
| 8,209,395 B2 | 6/2012 | Richoux |
| 8,667,049 B2 | 3/2014 | Blumrich et al. |
| 8,774,625 B2 | 7/2014 | Binkert et al. |
| 8,797,843 B2 | 8/2014 | Kamath et al. |
| 9,124,959 B2 | 9/2015 | Xu et al. |
| 9,143,338 B2 | 9/2015 | Fricker |
| 9,325,604 B2 | 4/2016 | Li et al. |
| 9,442,786 B2 | 9/2016 | Singh et al. |
| 9,531,596 B2 | 12/2016 | Volpe et al. |
| 2007/0253437 A1 | 11/2007 | Radhakrishnan et al. |
| 2011/0307715 A1 | 12/2011 | Diab |
| 2013/0322838 A1 | 12/2013 | Julien et al. |
| 2014/0006815 A1 | 1/2014 | Castro-Leon et al. |

(Continued)

FOREIGN PATENT DOCUMENTS

| CN | 103501242 A | 1/2014 |
| WO | 98017043 A2 | 4/1998 |

OTHER PUBLICATIONS

Mell et al., "The NIST Definition of Cloud Computing," U.S. Department of Commerce, National Institute of Standards and Technology, Special Publication 800-145, Gaithersburg, MD, Sep. 2011, pp. 1-7.

(Continued)

*Primary Examiner* — Eric Wong
(74) *Attorney, Agent, or Firm* — Robert J. Shatto

(57) ABSTRACT

Embodiments of the present disclosure include an optical shuffle box. The optical shuffle box may include a set of optical connector ports and a set of optical fiber pigtails. Each optical fiber pigtail may have a first end and a second end. The second end of each optical fiber pigtail may include an optical connector. Each optical connector port may be communicatively coupled to the first end of two or more optical fiber pigtails.

19 Claims, 14 Drawing Sheets

(56) References Cited

U.S. PATENT DOCUMENTS

| | | |
|---|---|---|
| 2014/0149715 A1 | 5/2014 | Inman |
| 2014/0188996 A1 | 7/2014 | Lie et al. |
| 2014/0270762 A1* | 9/2014 | Li .......................... H04L 45/02 398/45 |
| 2015/0055952 A1 | 2/2015 | Younce et al. |
| 2015/0098700 A1 | 4/2015 | Zhu et al. |
| 2015/0237421 A1 | 8/2015 | Morgan et al. |
| 2016/0070282 A1 | 3/2016 | Chapel et al. |
| 2016/0077570 A1 | 3/2016 | Varadarajan et al. |
| 2016/0210261 A1 | 7/2016 | Oprea |
| 2016/0323037 A1 | 11/2016 | Leigh et al. |
| 2016/0335209 A1 | 11/2016 | Jau et al. |
| 2016/0380895 A1 | 12/2016 | Xiong et al. |
| 2017/0054524 A1 | 2/2017 | Gumaste et al. |

OTHER PUBLICATIONS

Ajima et al., "Tofu: A 6D Mesh/Torus Interconnect for Exascale Computers," Computer, IEEE Computer Society, vol. 42, Issue 11, 2009, pp. 36-40.

Cray, "Cray Xt3 Datasheet," Cray XT3™ Supercomputer Scalable by Design, © 2005 Cray, Inc., 6 pgs.

Punhani, et al., "A Modified Diagonal Mesh Interconnection Network," 2014 Annual IEEE India Conference (INDICON), © 2014 IEEE, pp. 1-6.

Tang et al., "Diagonal and Toroidal Mesh Networks," IEEE Transactions on Computers, vol. 43, No. 7, Jul. 1994, pp. 815-826.

Leroux et al., "New Developments on Tore Supra Data Acquisition Units", WEPMN020, Proceedings of ICALEPCS2011, Grenoble, France, Copyright © 2011, pp. 922-925.

Dockès et al., "30.8. Diskless Operation with PXE Chapter 30. Advanced Networking", https://www.freebsd.org/doc/handbook/network-diskless.html, C. (2017), pp. 1-7.

* cited by examiner

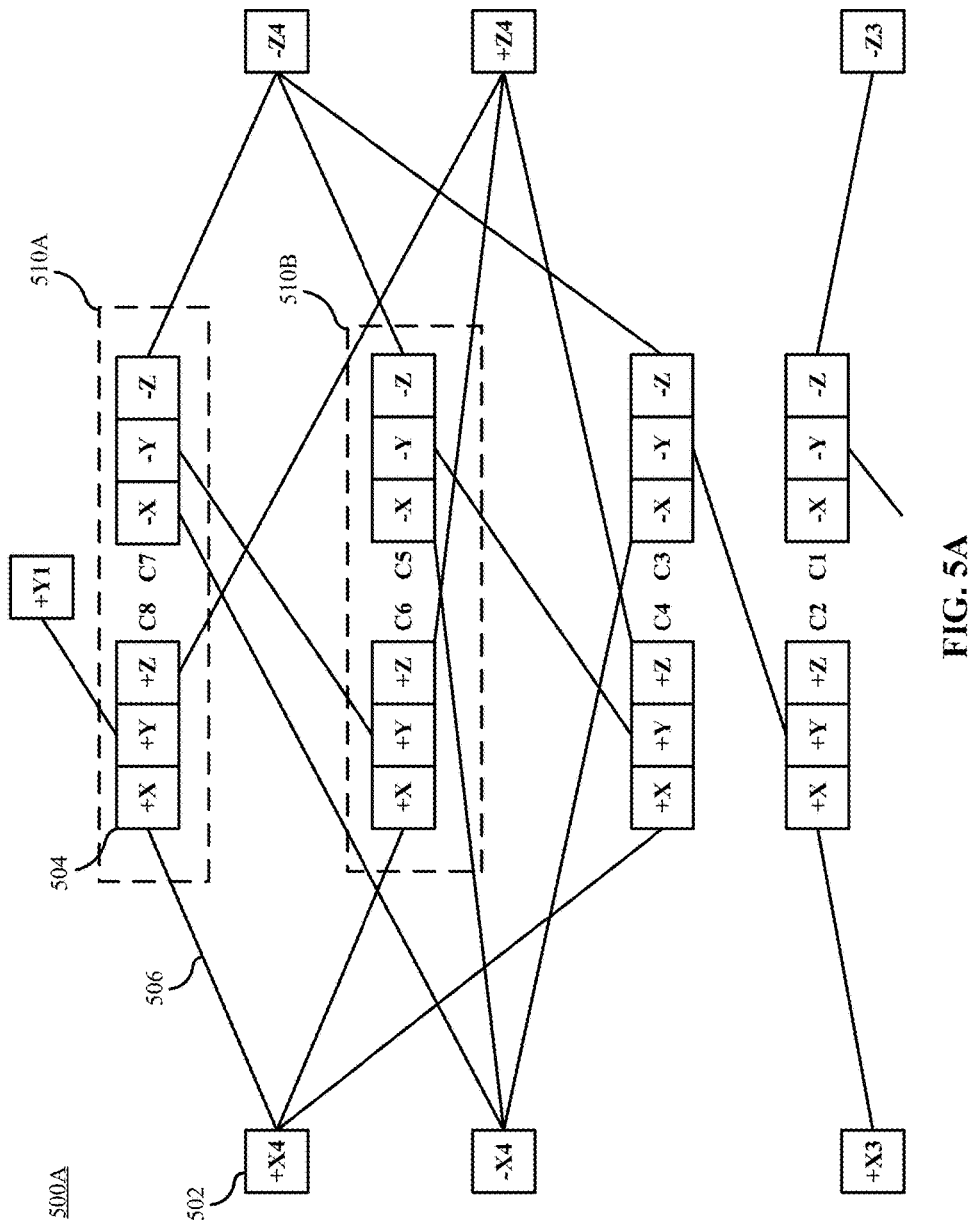

MULTIDIMENSIONAL TORUS SHUFFLE BOX

BACKGROUND

The present disclosure relates generally to the field of cloud computing, and more particularly to a shuffle box for generating a multidimensional torus network topology.

Patch panels, such as rack-level shuffle boxes, are used for connecting nodes and routing cables in computer networking. They can contain arrays of optical connectors on a back panel, allowing nodes to connect to the patch panel. Internal wiring then connects the nodes together to form a network of interconnected nodes.

SUMMARY

Embodiments of the present disclosure include an optical shuffle box. The optical shuffle box may include a set of optical connector ports and a set of optical fiber pigtails. Each optical fiber pigtail may have a first end and a second end. The second end of each optical fiber pigtail may include an optical connector. Each optical connector port may be communicatively coupled to the first end of two or more optical fiber pigtails.

Additional embodiments of the present disclosure include a system for communicatively coupling nodes. The system may include a first shuffle box and a second shuffle box. Each of the first and second shuffle boxes may include a set of optical connector ports and a set of optical fiber pigtails. Each optical fiber pigtail may have a first end and a second end. The second end of each optical fiber pigtail may include an optical connector. Each optical connector port may be communicatively coupled to the first end of two or more optical fiber pigtails. The first shuffle box may be communicatively coupled to the second shuffle box using a fiber optical cable.

Further embodiments of the present disclosure include an additional system for communicatively coupling nodes. The system may include a plurality of shuffle boxes. Each of the plurality of shuffle boxes may include a set of optical connector ports and a set of optical fiber pigtails. Each optical fiber pigtail may include a bundle of fibers at one end and an optical connector at the opposite end. Each optical fiber pigtail may be attached to one or more optical connector ports. Each shuffle box may be communicatively coupled with a plurality of nodes using two or more optical fiber pigtails. Each shuffle box may also be communicatively coupled to six other shuffle boxes.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 5A illustrates a first portion of an internal wiring schematic of a shuffle box, in accordance with embodiments of the present disclosure.

Figure 1:
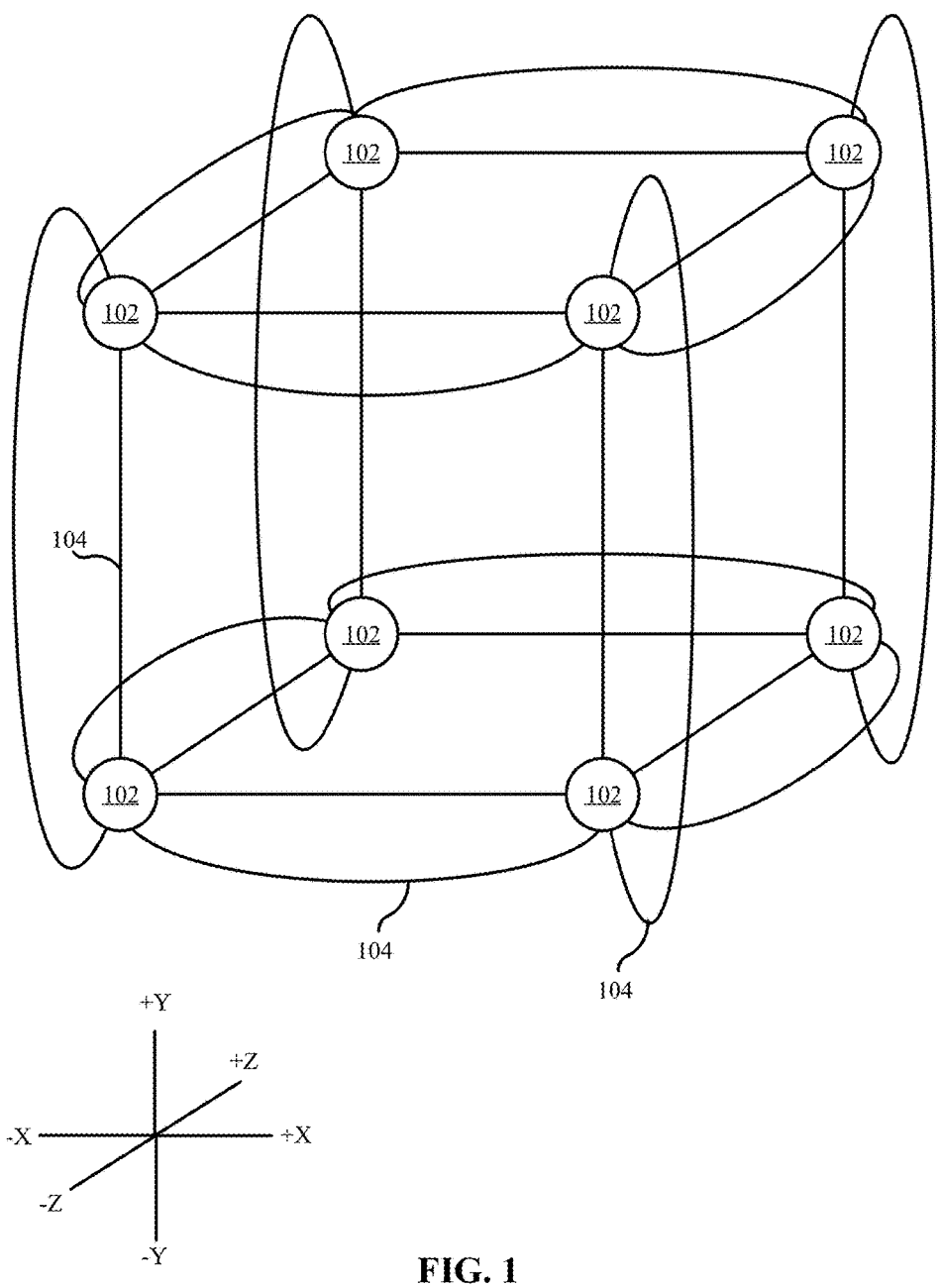
FIG. 1 illustrates an exemplary network topology for a distributed computing system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computing, and in particular to a shuffle box for generating a multidimensional torus network topology. While the present disclosure is not necessarily limited to such applications, various aspects of the disclosure may be appreciated through a discussion of various examples using this context.

Data centers running advanced distributed computing systems, such as Infrastructure as a Service and other cloud computing systems, are becoming increasingly bottlenecked. Areas of bottlenecking include network bandwidth and latencies between servers, network bandwidth and latencies between servers and storage nodes (e.g., high performance block storage systems), and top-of-rack (ToR) and management switch failures, which can take down groups of servers and/or storage nodes.

Additionally, racks with dense server deployments, as are often found in cloud computing systems, may have limited space for I/O cabling. This may cause problems because the number of cables used to link all of the servers and storage nodes may be large. Take, as an example, a cloud computing system that uses a 3D torus network topology with 48 servers in a rack. Each server may require six different cables (e.g., one for each of the positive and negative X, Y, and Z directions) to link the servers together. Accordingly, the rack would require 144 cables (e.g., 48*6 divided by 2, because each pair of servers share a cable) to provide the 3D torus mesh. Additionally, each server may have a management network connection to a management switch in the rack, increasing the total number of I/O cables for the rack to 192 cables.

This may lead to numerous problems. For example, connecting the high number of cables in the limited space provided by the rack may be a time consuming process that is also prone to errors (e.g., incorrect cable routing/connecting). Additionally, the high number of cables may impede air flow and make cooling the various servers difficult. Furthermore, each fiber cable must be carefully attached without any dirt getting introduced in the process. In large cloud data centers, this may be challenging to do across thousands of servers successfully. Moreover, an increase in the number of cables also increases the optical loss budget. Because this next generation shuffle box is carrying a large amount of data (e.g., 300 Gbps) per fiber cable (e.g., 25 Gbps per fiber, 12 Tx fibers and 12 Rx fibers within the cable), the transmission technology may be limited to very short distances. The majority of the optical loss comes from each connector. Using current patch panel boxes may require 6 total connectors in the path between any two nodes in the torus. With 6 connectors, transmission distances of up to 30 meters may not be realized without experiencing a high bit error rate.

Current distributed computing deployments often include a management network with a single point of failure. Typically, each server has a single management connection that connects the server to a management switch. All management packets that need to be sent from/to a particular server are transmitted using the single connection between the particular server and the management switch. Accordingly, in the event that the cable, the management connector on the server, or a connector on the cable break, or the management switch fails, then management data/packets will be unable to reach the particular server, and all management capability to that server or group of servers will be lost. If a system utilizes multiple management connections between each server and the management switch, it will require additional cables, which may further exacerbate the problems described above with regard to the number of cables in the system.

Embodiments of the present disclosure include a shuffle box communicatively couple to high speed switches (e.g., 600 Gbps switches) embedded in every server and storage node. The shuffle box may be communicatively coupled to the switch using any suitable optical connection technology (e.g., optical Ethernet). The shuffle box may include a set of optical connector adapters and a set of optical pigtails. The optical connector adapters, also referred to herein as ports, may be multi-fiber push on (MPO) connector adapters, such as MTP connector adapters. The MPO ports may be used to connect shuffle boxes together using MPO fiber cables (i.e., fiber cables having MPO connectors). The pigtails may be optical pigtails that are directly connected or fused on one end within the shuffle box (e.g., to the MPO ports), and have MPO connectors on the other end that connect to the servers and storage nodes. Within the shuffle box, internal cabling (e.g., optical fiber cabling) may interconnect the connector ports to the pigtails. The internal cabling may route signals (e.g., data packets and/or management packets) in such a way as to create a 3D torus fabric. Additional embodiments of the present disclosure include a method of manufacturing the shuffle box, and a method for establishing and managing a 3D torus fabric using one or more shuffle boxes.

Embodiments of the present disclosure may address one or more of the above problems by integrating the 3D torus data network (e.g., 3D torus mesh or fabric) and the management network on the same physical cabling. A management entity running inside the torus (e.g., as a node or within a node in the torus) may manage the various nodes by accessing each node over the fabric. The management entity may utilize a virtual networking path to manage the nodes on the same physical fabric that carries the data. Embodiments of the present disclosure may include a fabric processor in each node with a local connection to the management entity, so management traffic can flow on the torus with other traffic, but can be separated out at the target node by the fabric processor to forward management traffic destined for that node's management entity.

Several advantages may be realized through the integration of the 3D torus mesh with the management network. First, because there is no need for separate management cabling, there are fewer cables in the rack than otherwise needed. Accordingly, errors and time requirements associated with connecting a large number of cables would likely be reduced. Additionally, fewer cables allow for better airflow to the servers, resulting in better cooling. Second, the integration creates redundancy in the management path without requiring additional management path cables. As opposed to solutions with a dedicated management switch, integrating the management network onto the 3D torus fabric can take advantage of the redundancy that already exists within a 3D torus topology, as each server in the disclosed 3D torus topology already has two or more cables (e.g., two 300 Gbps cables) that connect it to the rest of the 3D torus fabric. Third, management actions performed using the 3D torus cabling can run at native speeds of the torus (e.g., 600 Gbps distributed switch architecture, with 100 Gbps in each of the positive and negative X, Y, and Z directions), and not low speeds (e.g., 1 Gbps) as found in traditional management networks in a cloud environment. This allows for rapid PXE boot and control and deployment of customer images to nodes within the 3D torus at 10 to 100 times faster than normal, which means the cloud can morph its VMs and bare metal images while the cloud is running at very high speeds.

Additionally, embodiments of the present disclosure can address issues related to the number of cables required to establish the 3D torus fabric through the layout of the shuffle box. Unlike traditional systems, which use a patch panel box, the disclosed shuffle box utilizes a combination of pigtails that protrude from each shuffle box to the nodes and cabling between the shuffle boxes to create the 3D torus fabric. The use of pigtails to connect the nodes to the shuffle box can reduce the number of connectors required by 33% or more. Accordingly, the 3D torus layout realized by the disclosed shuffle box can limit the total number of connectors in the path between any two nodes in the torus to four.

For example, assume a 3D torus fabric having 48 servers per rack. As discussed herein, using traditional shuffle boxes, this requires 144 cables to handle the data traffic, and 48 additional cables to handle the management traffic, for a total of 192 cables per rack. In some embodiments of the present disclosure, the 48 servers in the rack are connected using four shuffle boxes, each shuffle box handling connections for 12 servers. Each shuffle box connects to other shuffle boxes using 18 cables, and each shuffle box connects to its 12 servers using 24 pigtails. Accordingly, the total number of cable to connect the servers to the shuffle box is 96 (4×24), and the total number of cables needed to connect the shuffle boxes is 36 (18×4 divided by 2), for a combined total number of cables of 132 per rack, as opposed to the 192 cables required with traditional shuffle boxes.

By limiting the number of connectors required to connect nodes in the 3D mesh, data can be transmitted at high speeds (e.g., 100 Gbps in each of the positive and negative X, Y, and Z directions for a combined 600 Gbps fabric speed using two 300 Gbps cables) even at distances as long as 30 meters. Furthermore, reducing the number of cables required to create the 3D torus fabric can increase air flow, decrease the amount of time required to connect the system and the potential for errors in doing so, and decrease the number of surfaces that have to be thoroughly cleaned (e.g., the fiber connectors) to ensure dust and other particles do not cause noise or signal degradation.

As recognized herein, high fiber count connectors typically have insertion losses ranging from 0.5 to 1.0 dB and sometimes even higher (e.g., 1.5 to 2.0 dB). Traditional shuffle boxes would then add 1 to 3 dB or more of additional insertion loss to a fiber link above the loss present due to other factors (speed of switches, loss due to the fiber cablings itself, etc.). In today's high speed optical links, (e.g., Ethernet 100Gbase-SR4 standard), the total budget for connector loss is 2 dB or lower. So the insertion of a traditional shuffle box into a fiber link could greatly reduce or eliminate any margin or even result in negative margin in the optical link. One result of negative margin would be the use of an error correction code to make up for the lost margin. Error correction codes introduce complexity and latency, the latter of which will affect system performance.

However, a pigtailed fiber shuffle box according to embodiments of the present disclosure not only reduces insertion loss, it reduces cable cost as it eliminates an external fiber jumper. A pigtailed fiber shuffle also reduces cabling errors as one end of this connection is permanently attached to the rack-scale shuffle box. To further reduce cabling errors, the pigtails can have different colored connectors. The different colored connectors may allow for quick and easy visual inspection of correct rack cabling. The pigtail lengths can be tailored to their specific drawer location. This has at least two benefits: first, it reduces cable slack, and second, it can reduce cabling errors (e.g., the shortest cable can only reach to the nearest drawer and no others).

Embodiments of the present disclosure may additionally overcome the excessive losses from cumulative connectors by cutting the number of connectors from 6 down to 4 because the use of pigtails removes two connectors. Previously, the loss budgets without the pigtails were acceptable for lower data rates. However, those approaches are inadequate to support the 100 Gbps 802.3bm standard for large scale torus implementations because the bit error rate would be too high from the additional losses of 2 extra connectors. If a Reed Solomon decoder would have to be implemented in the receiver, then there is significantly higher latency through the switch at each node, making a large scale torus impractical without high latencies between any two nodes.

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 illustrates an exemplary network topology 100 (e.g., a 3D torus fabric) for a distributed computing system, in accordance with embodiments of the present disclosure. In the example shown in FIG. 1, the topology is represented as a 3-dimensional lattice, with each circle representing a cabled node 102. The nodes 102 may include, but are not limited to, server computers, storage systems, management entities, other computer systems, or any combination thereof. The lines connecting nodes 102 represent cables 104 between the cabled nodes 102. In some embodiments, the cables 104 may be optical fiber cables.

In some embodiments, cables 104 comprise Ethernet connections. In embodiments where cables 104 comprise Ethernet connections, individual Ethernet connections can be rated for 100 gigabit per second (Gbps) performance. As can be seen in FIG. 1, in some embodiments, each node 102 is connected to six adjacent nodes in a torus structure via six cables 104. Thus, in embodiments utilizing 100 Gbps Ethernet connections in a torus structure, the network topology 100 (e.g., 3D torus fabric) can be rated for 600 Gbps internode connectivity.

In some embodiments, network topology 100 is rated for larger or smaller internode connectivity such that the network topology 100 exhibits appropriately low latency during operation. In some embodiments, a larger number of nodes 102 may utilize cables 104 rated for higher speeds than previously described to reduce potential latency. In some embodiments, network topology 100 can be arranged in alternative configurations that could utilize cables 104 rated for higher or lower data transfer rates than previously described based on the alternative conceptual configuration of the fabric attached architecture.

In some embodiments, the internode connectivity speed is sufficient to realize latencies of less than 25 microseconds (e.g., intra pod latency). In some embodiments, the internode connectivity speed is at least approximately 100 Gbps, 200 Gbps, 300 Gbps, 400 Gbps, 500 Gbps, or 600 Gbps. In some embodiments, the internode connectivity speed is a rated internode connectivity speed. In some embodiments, the internode connectivity speed is a measured internode connectivity speed. In some embodiments, rated and measured internode connectivity speeds are associated with manufacturing tolerances and measurement tolerances such that although a single number is indicated (e.g., 600 Gbps), a range of numbers is implied (e.g., 500-700 Gbps, 550-650 Gbps, or 590-610 Gbps).

In some embodiments, the nodes comprise different resources (e.g., compute resources, storage resources, networking resources, etc.), different families of similar products (e.g., different brands of storage resources), and/or different generations of one product (e.g., legacy systems) that are presented to a fabric attached architecture according to a fabric protocol.

In some embodiments, cables 104 can be configured to accommodate alternative connections such as, but not limited to, Fibre Channel connections, Asynchronous Transfer Mode connections, and/or InfiniBand connections.

Although network topology 100 is shown in as a torus structure, the fabric can also be configured in numerous alternative arrangements such as, but not limited to, a diagonal mesh (e.g., a three-dimensional diagonal mesh) or a multi-link mesh (MLM) (e.g., a three-dimensional MLM).

As can be seen in FIG. 1, the distributed computing system may be arranged using a 3D torus topology. It is to be understood in advance that the 3-D torus topology shown in FIG. 1 is a visual representation of the topology and communicative connections between nodes, and is not intended to show the actual physical arrangement of nodes (e.g., on a board or within a rack) and/or cables. Accordingly, the cables between nodes do not necessarily represent actual cables (e.g., physical cables that are connected to each node), but rather represent a communicative connection between nodes. As such, the present disclosure should not be limited to the arrangement of nodes and/or cables shown in FIG. 1.

Within the topology, each node 102 has six cables 104, one for each of the positive X, Y, and Z directions, and one for each of the negative X, Y, and Z directions. Outer-most cabled nodes 102, such as nodes edges of the torus 100, will have one or more "wrap-around" cables 104 that connect the node to nodes on the opposite side of the torus 100. For example, a node 102 that sits at the end of the torus 100 in the +X direction will have a wrap-around cable 104 that connects it to a node that sits at the end of the torus 100 in the −X direction. Likewise, corner nodes 102 will have three wrap-around cables 104, one for each of the X, Y, and Z directions.

While the example 3D torus fabric 100 in FIG. 1 is shown with eight nodes 102 arranged in a 2×2×2 arrangement, any number of nodes otherwise consistent with this disclosure is contemplated. In some embodiments, the 3D torus fabric 100 may include more nodes (e.g., at least 5,000 nodes or at least 16,000 nodes), and the nodes may be arranged with unbalanced directionality. In other words, the nodes may be arranged as an N×N×N (e.g., cubic) 3D torus fabric, where the number of nodes in each direction is identical as shown in the example in FIG. 1. In other embodiments, the nodes may be arranged in a 3D torus fabric where the number of nodes in a particular direction differs from the number of nodes in a different direction (e.g., a 22×24×10 fabric).

While the network topology 100 shows a 3D torus fabric having a plurality of nodes 102 physically connected to each other such that each node 102 has 6 direct connections 104 to neighboring nodes 106, as will be understood by a person of ordinary skill in the art, embodiments of the present disclosure may not have any nodes directly connected to each other. Instead, various embodiments of the present disclosure may include one or more shuffle boxes that are directly connected to the nodes (e.g., using pigtails) and to other shuffle boxes. As described in more detail herein, the shuffle boxes may be connected such that the nodes are arranged in a 3D torus configuration.

Figure 2:
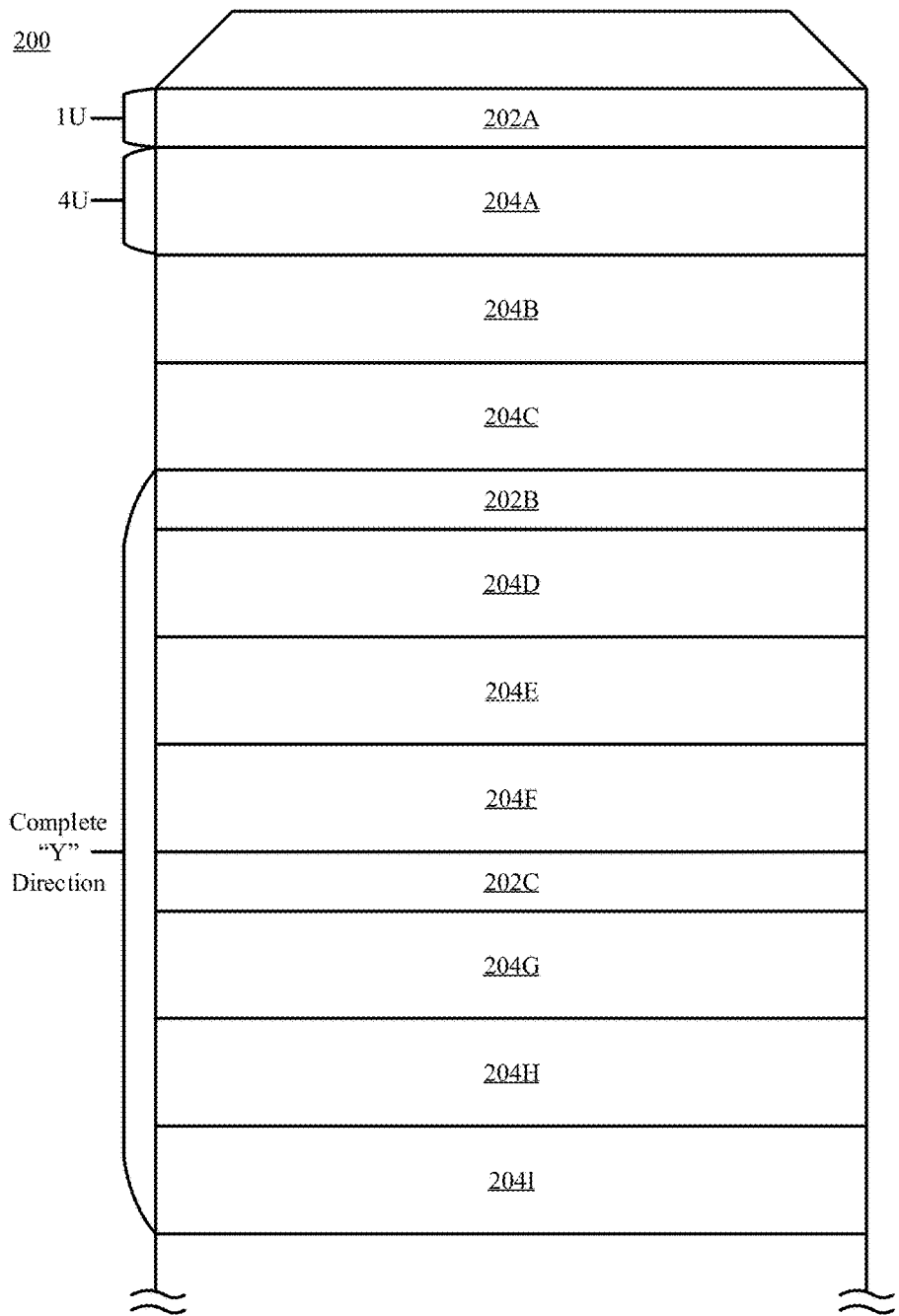
FIG. 2 illustrates a conceptual view of an example rack enclosure having a plurality of shuffle boxes and chassis, in accordance with embodiments of the present disclosure.

Referring now to FIG. 2, illustrated is a conceptual view of an example rack enclosure 200 having a plurality of shuffle boxes 202A-C and chassis 204A-I, in accordance with embodiments of the present disclosure. Each shuffle box 202A-C is communicatively coupled to a set of compute or storage servers (e.g., nodes), which are organized into three chassis. For example, the first shuffle box 202A is communicatively coupled to servers in the first three chassis 204A-C; the second shuffle box 202B is communicatively coupled to servers in the next three chassis 204D-F; and the third shuffle box 202C is communicatively coupled to servers in the last three chassis 204G-I.

In some embodiments, the shuffle boxes 202A-C may be 1 U tall shuffle boxes that handle cable routing between their associated servers and servers associated with other shuffle boxes 202A-C. For example, the second shuffle box 202B may connect its associated servers (e.g., those in the middle three chassis 204D-F) to the servers in the bottom three chassis 204G-I via the third shuffle box 202C. The shuffle boxes are discussed in more detail below, for example in reference to FIGS. 4A, 5A, and 5B.

Each chassis 204A-I may include a subset of servers that are associated with (e.g., directly communicatively coupled to) a particular shuffle box. While servers within a particular chassis may share some I/O devices (e.g., a CD drive, USB connector, etc.) or other connectivity (e.g., power connections), in some embodiments each server may have its own I/O devices (e.g., each server may have its own dedicated CD drive) and connectivity. In these embodiments, the chassis may only provide the hardware necessary to secure the servers to the rack. The chassis 204A-I shown in FIG. 2 are 4 U tall chassis. Each chassis 204A-I may contain four full-width sleds that can house server computers. As shown in FIG. 2, a set of 2 shuffle boxes and 6 chassis (which may include 24 servers), can make up an entire "Y" direction of the 3D torus fabric.

It should be noted that in some embodiments there may be more or fewer servers per chassis. Additionally, other size chassis may be utilized. For example, instead of using a 4 U tall chassis with 4 full-width servers, some embodiments may utilize 2 U tall chassis with 4 half-width servers, as seen in FIG. 4B. Additionally, a single rack 200 may include more shuffle boxes 202A-C and chassis 204A-I than shown in FIG. 2. The present disclosure should not be limited to the embodiments shown in FIG. 2, which is provided for illustrative purposes.

Figure 3:
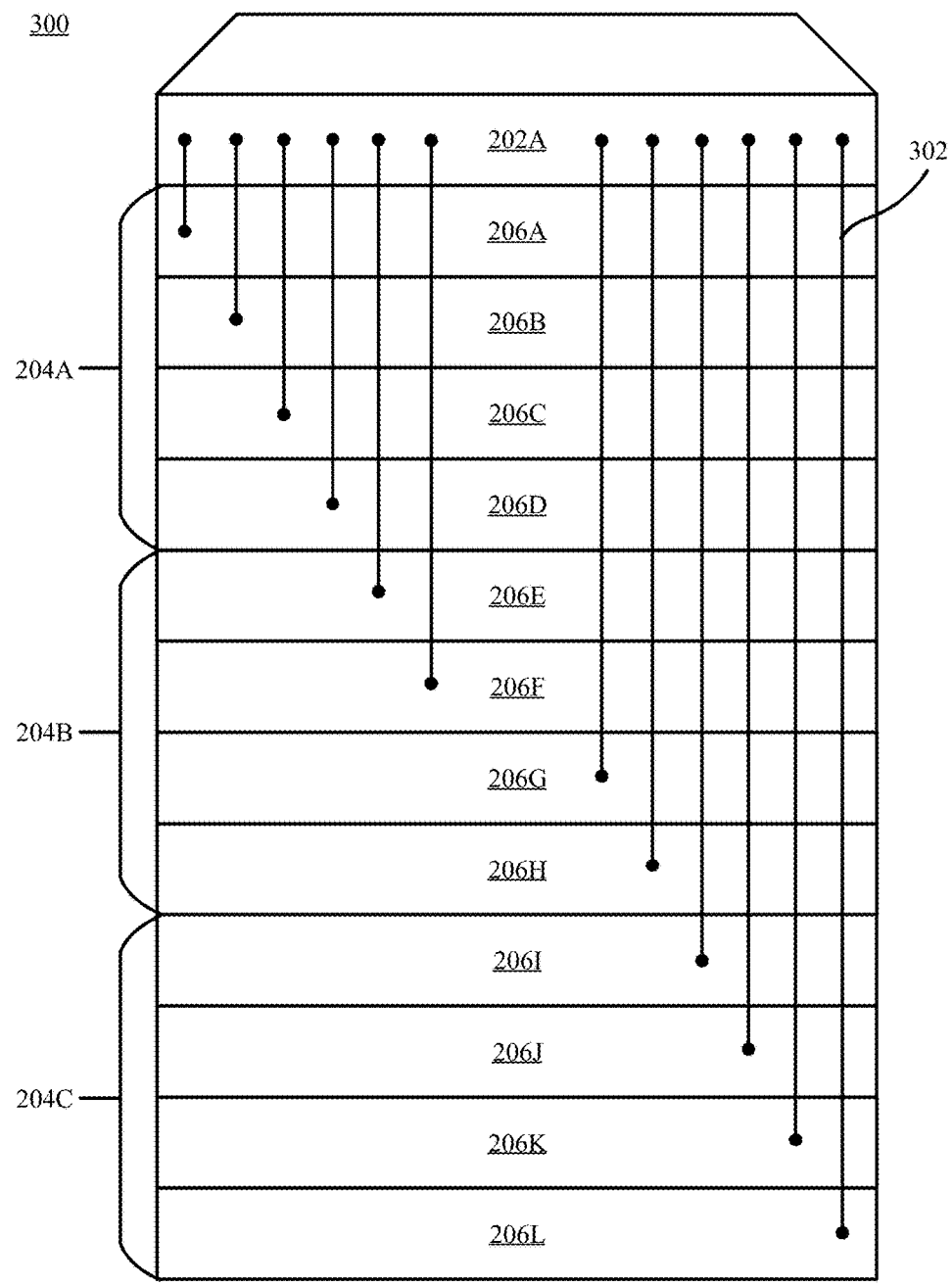
FIG. 3 illustrates an example arrangement of a shuffle box and corresponding server or storage nodes within a rack, in accordance with embodiments of the present disclosure.

Referring now to FIG. 3, illustrated is an example arrangement of a shuffle box 202A and corresponding compute or storage servers 206A-L within a rack, in accordance with embodiments of the present disclosure. As discussed herein, a single shuffle box 202A may be connected to a set of compute or other storage nodes 206A-L (e.g., storage server nodes), which may be arranged into a set of chassis 204A-C. Each chassis 204A-C includes 4 full-size sleds that house the servers 206A-L. In order to minimize cabling length requirements, the servers associated 206A-L with the shuffle box 202A may be grouped together within the rack such that each server is adjacent to either another server connected to the same shuffle box, or to the shuffle box itself.

As shown in FIG. 3, the shuffle box 202A is communicatively coupled to each of the servers 206A-L using optical cables 302 (e.g., MPO cables). While each server 206A-L is shown as connecting to the shuffle box 202A using a single cable 302, in some embodiments multiple cables may be used to connect the shuffle box 202A to the servers 206A-L. For example, as discussed herein, the shuffle box 202A may be connected to each server 206A-L using pigtail connectors such that two (or more) independent connections are made between the shuffle box 202A and each server 206A-L so that there are at least two paths to every server in case a cable fails (e.g., for redundancy and reliability). Additionally, as shown in FIG. 3, the servers 206A-L may not be directly connected to each other (e.g., have a cable running between the servers). Instead, each server 206A-L may be directly connected to the shuffle box 202A, and internal wiring of the shuffle box 202A may be configured to connect the servers 206A-L to each other.

Figure 4A:
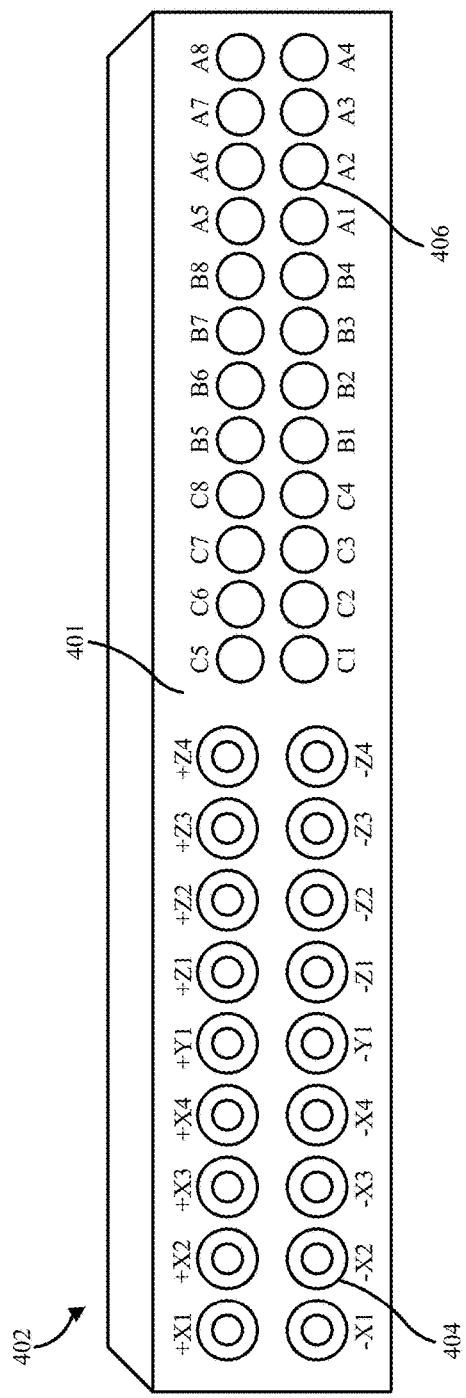
FIG. 4A illustrates a rear view of an example shuffle box, in accordance with embodiments of the present disclosure.
Figure 4B:
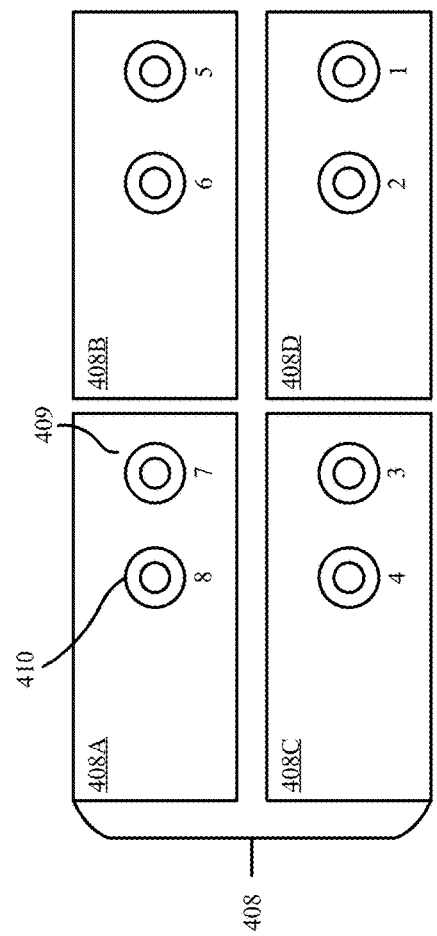
FIG. 4B illustrates a rear view of an example chassis having four half-width servers, in accordance with embodiments of the present disclosure.

Referring now to FIG. 4A, illustrated is a rear view of an example shuffle box 402, in accordance with embodiments of the present disclosure. The shuffle box 402 may be the same as, or substantially similar to, the shuffle box 202A shown in FIGS. 2 and 3. The shuffle box 402 may include a set of optical ports 404 (e.g., MPO connector ports) on a back panel (or connector board) 401 that are configured to receive (e.g., connect to) optical fiber cables (e.g., MPO cables). The shuffle box 402 also includes a set of optical pigtails 406. The optical pigtails 406 may be directly connected to the internal wiring of the shuffle box 402 (e.g., one or more optical fibers or optical fiber pairs within the optical pigtails 406 may be directly connected to an adapter within the shuffle box 402, to one or more ports 404, or to one or more other pigtails 406). The optical pigtails 406 may be optical cables that protrude out of the shuffle box 402, terminating in an optical connector or plug (not shown).

The shuffle box 402 may be configured to connect to other shuffle boxes within a 3D torus fabric using the set of optical ports 404. In other words, shuffle boxes may be connected to each other using high speed optical cables (e.g., 300 Gbps MPO cables) connected to the optical ports 404 of the shuffle boxes. The shuffle box 402 may be connected to each adjacent shuffle box in the positive and negative X and Z dimensions using four optical cables each. For example, the shuffle box 402 may connect to a shuffle box in the −X direction using four optical cables (labeled −X1, −X2, −X3, and −X4 in FIG. 4A). Likewise, the shuffle box 402 may connect to a shuffle box in the +Z direction using four optical cables (labeled +Z1, +Z2, +Z3, and +Z4). This may be done because the bandwidth of each MPO cable connecting the shuffle boxes may be less than the total bandwidth between nodes in that direction.

Figure 5B:
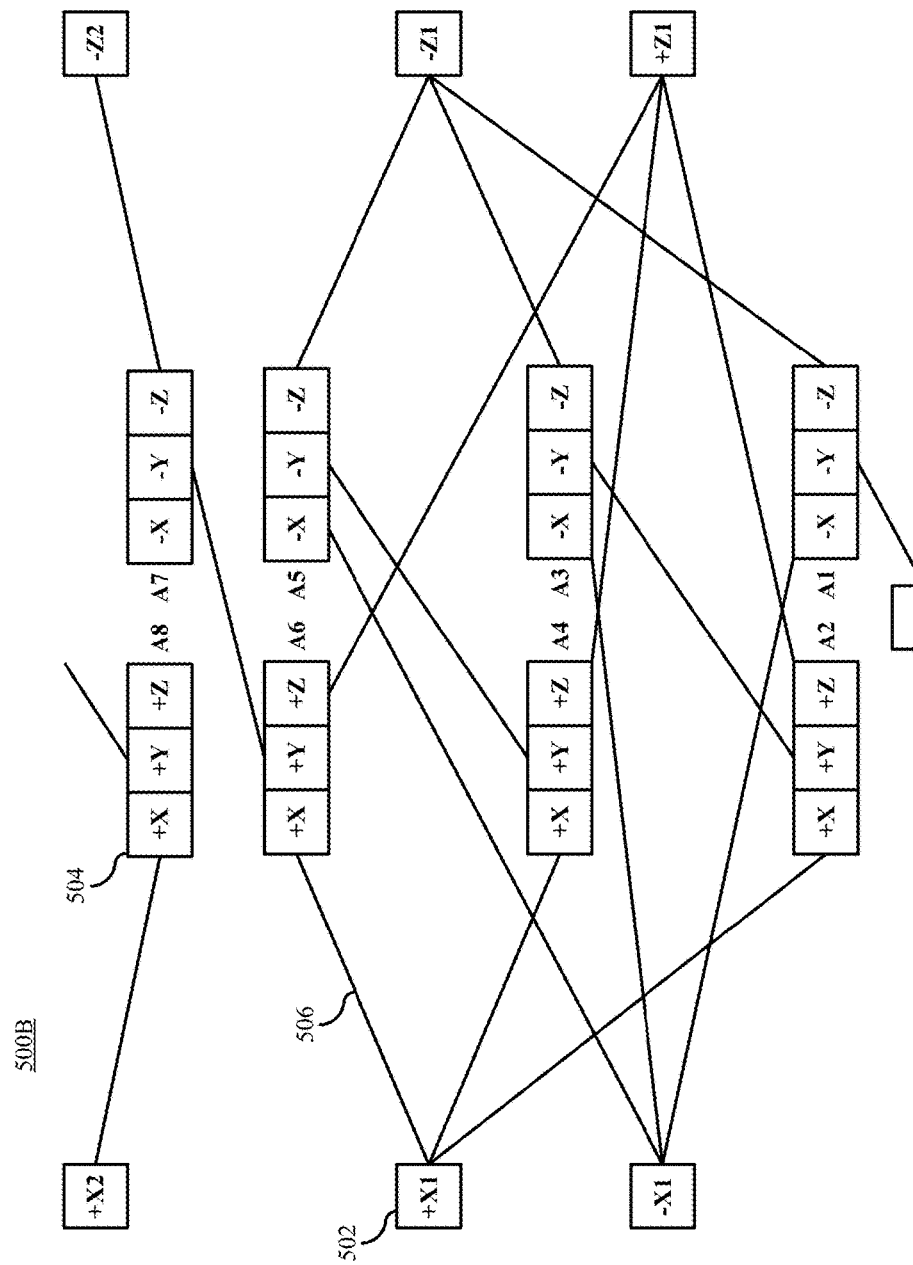
FIG. 5B illustrates a second portion of an internal wiring schematic of a shuffle box, in accordance with embodiments of the present disclosure.

For example, the shuffle box 402 shown in FIG. 4A may be configured to handle the inter-node connections for 12 nodes (e.g., servers). The 12 nodes connected to the shuffle box may make up half of a vertical (e.g., Y) direction. Each node may be configured to connect to adjacent nodes in the 3D torus (e.g., in each of the positive and negative X, Y, and Z directions) with a speed of 100 Gbps. Accordingly, the combined bandwidth of the 12 nodes may be 1200 Gbps in each direction. Additionally, the shuffle box may be configured to connect to adjacent shuffle boxes (e.g., a shuffle box in the +X direction) using 300 Gbps MPO cables, a single cable may be insufficient to provide the entire 1200 Gbps bandwidth desired. Accordingly, the shuffle box 402 may have four ports for the +X direction, each capable of delivering data at 300 Gbps, to achieve the desired 1200 Gbps combined bandwidth. Likewise, the shuffle box 402 may have four ports for the −X, +Z, and −Z directions to achieve the desired bandwidth. Because the servers associated with the shuffle box 402 constitute half of the vertical (Y) direction, internal wiring within the shuffle box (as shown in FIGS. 5A and 5B) handles most of the vertical traffic between nodes. Accordingly, only 2 ports are required for the Y direction: one for each of the direct and wrap-around connections between the first half of the Y direction nodes and the second half of the Y direction nodes.

While the example shuffle box 402 shown in FIG. 4A has 18 ports (8 for each of the X and Z directions, and 2 for the Y direction), any number of ports otherwise consistent with the present disclosure may be used. The number of ports may be based on the dimensions of the 3D torus, the desired speed/bandwidth of the 3D torus, the number of compute and/or storage servers per shuffle box, and the speed of individual ports/cables, among other considerations. Accordingly, the application should not be limited to the example shown in FIG. 4A.

Additionally, the shuffle box 402 may be configured to connect to a set of servers using the set of optical pigtails 406. The pigtails 406 may be high speed optical pigtails (e.g., 300 Gbps MPO cables). Each server may be connected to the shuffle box using two or more pigtails 406. This may ensure that there is redundancy within the system, as the failure of a single connection (e.g., a connector on the server, as shown in FIG. 4B) would not cut off all communications between the shuffle box and the server. Because the 3D torus has massive path redundancy, as long as there is one cable out of the server working even with one cable down, an alternative route can be established through the torus to still get to the destination server.

For example, as shown in FIG. 4B, each chassis 208 may include four sleds, each sled containing a half-width server 408A-D. Each sled may be connected to the shuffle box using a pair of 24 fiber MTP cables. The two 24 fiber MTP cables that connect to each sled provide full redundancy for reaching the sled/node. One may cover the +X, +Y, +Z path for the 3D torus, and the other may cover the −X, −Y, −Z path. So if a cable to a particular node breaks, the particular node just communicates over the other path. Because each path may provide for high speed and bandwidth (e.g., they may be 100 Gbps paths), a break in a cable may not slow down the connection to the node. What a failed cable may do is to create more congestion for traffic flowing through the node because it only has half as many paths to flow to the next node. So in practice, the node may not experience any slow down at all in its 100 Gbps ingress and egress traffic. Furthermore, because the management network is integrated into the 3D fabric in some embodiments, the management network has full redundancy.

For illustrative purposes, the pigtails 406 shown in FIG. 4A are labeled according to the chassis (e.g., chassis A, chassis B, and chassis C) and connector number. The connector number in FIG. 4A corresponds to the number shown in FIG. 4B for the servers. For example, the third chassis 408 (chassis C) is shown in FIG. 4B. The third chassis 408 includes four servers 408A-D, each having two ports 410 on a back panel 409 of the server. Each port 410 corresponds to a pigtail in the shuffle box 402. For example, the C5 pigtail shown in FIG. 4A corresponds to (e.g., is connected to) connector 5 in the third chassis 408, which is associated with the second server 408B.

The example shuffle box 402 shown in FIG. 4A is capable of connecting to 12 sleds (e.g., nodes) using the 24 pigtails 406. However, it is noted that the number of sleds supported by a single shuffle box can be more or fewer than 12, and the present disclosure should not be limited to the example shown in FIG. 4A.

FIG. 5A illustrates a first portion 500A of an internal wiring schematic of a shuffle box (e.g., the shuffle box 402 shown in FIG. 4A), in accordance with embodiments of the present disclosure. Specifically, FIG. 5A illustrates most of the connections to the third chassis servers from FIGS. 4A and 4B. The wiring schematic shows a set of ports 502 (e.g., +X4, −X4, +X3, −Z4, +Z4, and −Z3). The set of ports 502 may be the same as, or substantially similar to, the set of ports 404 described in reference to FIG. 4A. The wiring schematic further shows a set of pigtail directions 504 associated with the set of pigtails C1-C8. The set of pigtails C1-C8 may be the same as, or substantially similar to, the set of pigtails 406 described in reference to FIG. 4A. Each pair of pigtails (e.g., C8 and C7, C6 and C5, C4 and C3, and C2 and C1) may be connected to a single server node (e.g., a compute or storage node).

Each port 502 in FIG. 5A is connected to three pigtails using a cable (e.g., 4 fiber pairs) 506 associated with a pigtail, with the exception of the +Y1 port which is used to provide wrap-around cabling along the Y direction. In some embodiments, each pigtail has 12 fiber pairs, and those fiber pairs are connected as three separate groups of 4 fiber pairs 506 for +X, +Y, +Z or −X, −Y, −Z. For example, the +X4 port 502 is connected to the +X portion of the C8, C6, and C4 pigtails. Likewise, the −Z4 port is connected to the −Z portion of the C7, C5, and C3 ports. While the +X3 and −Z3 ports are shown as only connecting to a single pigtail, namely the C2 and C1 pigtails, respectively, the +X3 and −Z3 ports may be connected to additional pigtails that are not shown in FIG. 5A. The cables 506 may be optical fibers (e.g., a bundle of fibers).

Additionally, each node connected to the shuffle box is connected to at least one other node that is directly connected to the shuffle box. For example, the first node 510A, which corresponds to the C8 and C7 pigtails, is connected to the second node 510, which corresponds to the C6 and C5 pigtails. Specifically, the C6 pigtail of the second node 510B is connected to the C7 pigtail of the first node 510A. The C1 pigtail is coupled with a pigtail of another server that is not shown in FIG. 5A (e.g., with the B8 pigtail shown in FIG. 4A).

While the cables 506 are shown as connecting to pigtail directions 504, this is done for illustrative purposes. In some embodiments, the bare end of the pigtails may connect to an adapter (e.g., a fiber optical adapter) within the shuffle box. Additionally, optical fibers may connect the adapters to the ports 502. However, in other embodiments, there may not be a separate physical connector or adapter within the shuffle box that both the pigtails (e.g., the C8 pigtail) and the ports 502 (e.g., the +X port) connect to. Instead, each pigtail may contain a set of bundled fibers (e.g., twelve 25 Gbps fibers), and the connections between the pigtail and a particular port may be made using a portion (e.g., some or all) of the set of fibers. For example, the C8 pigtail shown in FIG. 5A may contain twelve 25 Gbps fibers, and be responsible for handling the positive X, Y, and Z connections for the first node 510A. Four of those twelve fibers may connect directly to the +Y1 port, four may connect to the +X4 port, and four may connect to the +Z4 port. Accordingly, each cable 506 may contain a bundle of four 25 Gbps fibers, for a total bandwidth of 100 Gbps along the path made by the cable 506 (e.g., in each direction).

Embodiments having no internal adapters may be particularly advantageous because they remove an optical connector per shuffle box and up to two optical connectors between any two servers in the 3D torus connected by adjacent shuffle boxes when compared to embodiments having internal adapters. As optical connectors introduce the most significant losses in the light signal, the removal of these two optical connectors may improve the transmission speeds (which may be, e.g., 100 Gbps or more in some embodiments), while still remaining error free (or having low error rates) at the receiver.

FIG. 5B illustrates a second portion 500B of an internal wiring schematic of a shuffle box, in accordance with embodiments of the present disclosure. Specifically, FIG. 5B illustrates most of the connections to the first chassis servers from FIG. 4A. The wiring schematic shows a set of ports 502 (e.g., +X2, −X1, +X1, −Z2, +Z1, and −Z1). The set of ports 502 may be the same as, or substantially similar to, the set of ports 404 described in reference to FIG. 4A. The wiring schematic further shows a set of pigtail directions 504 associated with the set of pigtails A1-A8. The set of pigtails A1-A8 may be the same as, or substantially similar to, the set of pigtails 406 described in reference to FIG. 4A. Each pair of pigtails (e.g., A8 and A7, A6 and A5, A4 and A3, and A2 and A1) may be connected to a single node (e.g., a compute or storage server node).

Each port 502 in FIG. 5B is connected to three pigtails using a cable 506, with the exception of the −Y1 port which is used to provide wrap-around cabling along the Y direction. For example, the +X1 port 502 is connected to the +X portion of the A2, A4, and A6 pigtails. Likewise, the −Z1 port is connected to the −Z portion of the A1, A3, and A5 ports. While the +X2 and −Z2 ports are shown as only connecting to a single pigtail, namely the A8 and A7 pigtails, respectively, the +X2 and −Z2 ports may be connected to additional pigtails that are not shown in FIG. 5B. The cables 506 may be optical fibers (e.g., a bundle of fibers). Additionally, each node connected to the shuffle box is connected to at least one other node that is directed connected to the same shuffle box, as described in reference to FIG. 5A.

It is to be understood that the wiring schematic portions 500A and 500B shown in FIGS. 5A and 5B, respectively, are example wiring schematics. In some embodiments, the number of ports and pigtails may be different, and the number and arrangement of connections between the ports and pigtails may be different. For example, as described herein, the number of ports may be based on the ports' rated speed, the desired speed of the network, etc. Likewise, the number of pigtails may be based on the number of pigtails per server node, and the number of server nodes per shuffle box.

Figure 6:
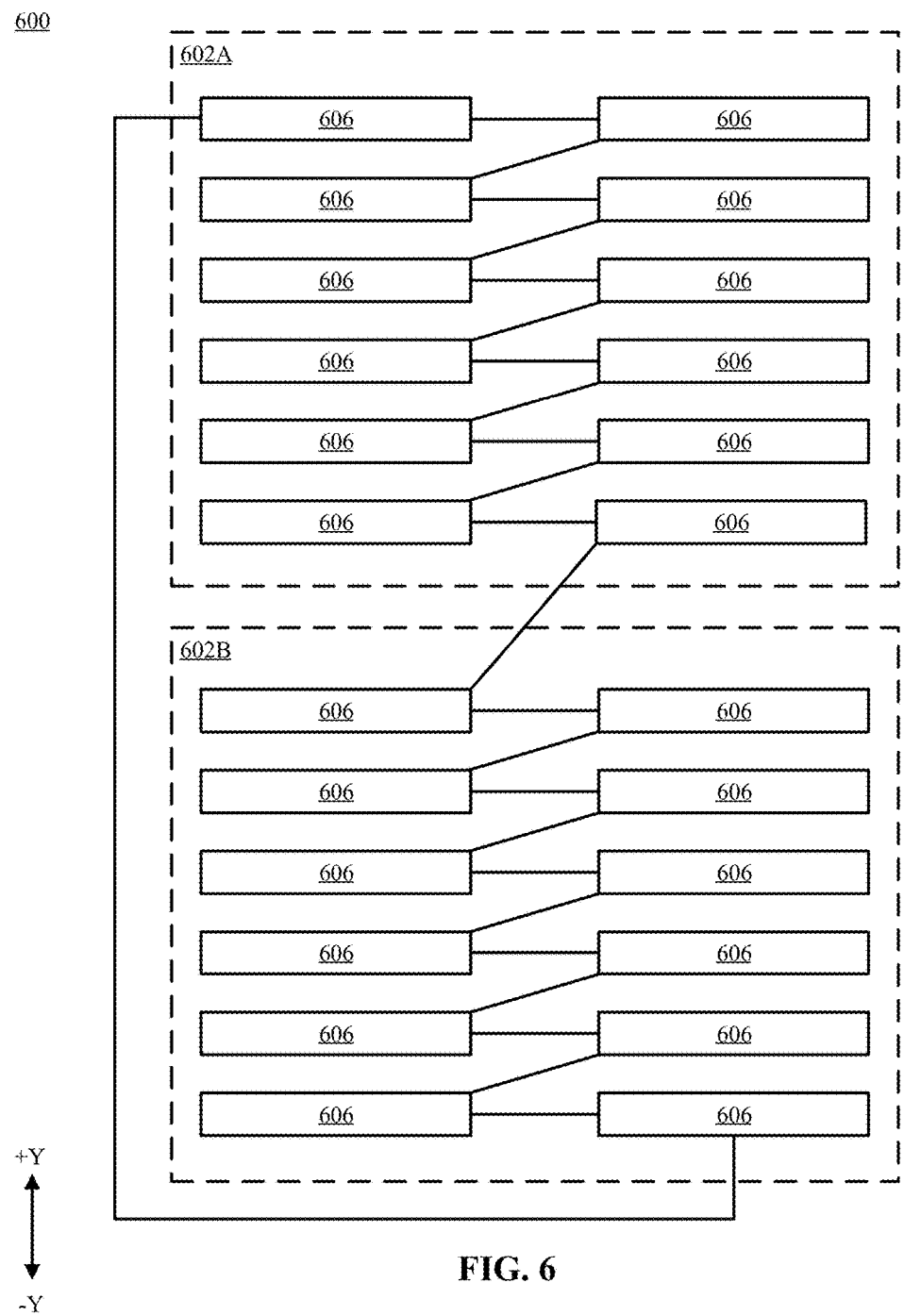
FIG. 6 illustrates an effective wiring diagram of single direction of an example 3D torus fabric having 24 servers, in accordance with embodiments of the present disclosure.

FIG. 6 illustrates an effective wiring diagram 300 of a Y direction of an example 3D torus fabric having 24 servers in the Y direction, in accordance with embodiments of the present disclosure. Specifically, the effective wiring diagram 300 does not show the actual physical cabling between nodes 606, but instead shows how the nodes are effectively (e.g., communicatively) connected in the Y direction through the use of two shuffle boxes 602A and 602B.

The first and second shuffle boxes 602A and 602B are communicatively coupled (e.g., with optical pigtails) to twelve nodes 606 each. Likewise, the shuffle boxes 602A and 602B are communicatively coupled to each other using two MPO cables, as described herein (e.g., in reference to FIG. 4A). Each node 606 is communicatively coupled to two additional nodes along the Y direction, one in the +Y direction and one in the −Y direction. As can be seen in FIG. 6, nodes at both ends of the Y direction are connected to each other with a wrap-around cable.

Figure 7:
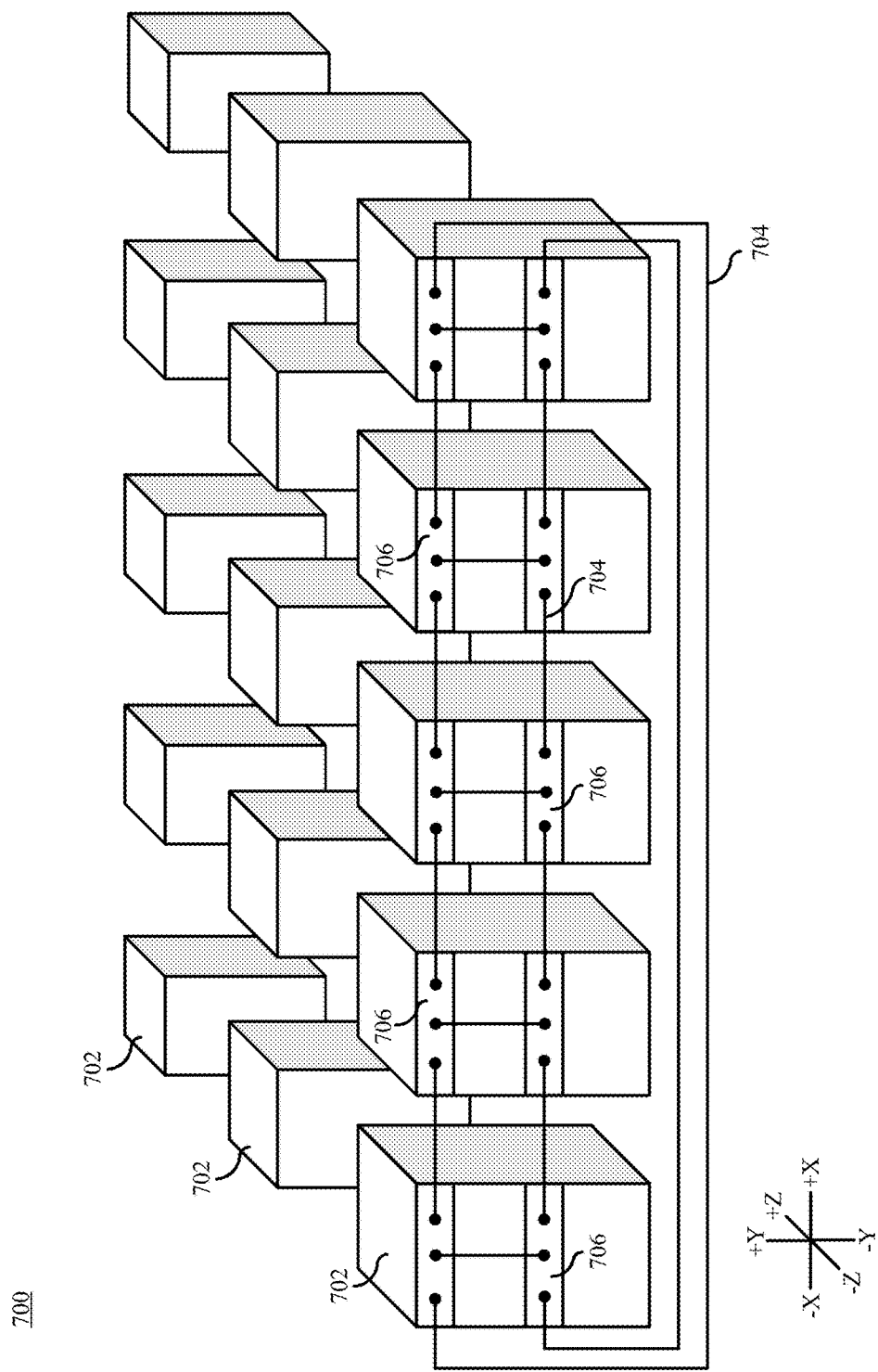
FIG. 7 illustrates an example arrangement of server racks implementing a 3D torus fabric using a shuffle box within a data center, in accordance with embodiments of the present disclosure.

Referring now to FIG. 7, illustrated is an example data center arrangement 700 of server racks 702 implementing a 3D torus fabric using shuffle boxes 706, in accordance with embodiments of the present disclosure. As shown in FIG. 7, the server racks 702 within a single row (e.g., along the X direction) may make up the X component of the 3D fabric. Likewise, the servers within each rack 702 may make up the Y component of the 3D fabric, and the number of rows (e.g., along the Z direction) may make up the Z component of the 3D fabric.

Each rack 702 contains a pair of shuffle boxes 706. As described herein, the shuffle boxes 706 are communicatively coupled to a set of servers (not shown) using pigtails. Additionally, each shuffle box 706 is connected to one or more other shuffle boxes 706 within the same rack 702, as well as one or more shuffle boxes 706 in neighboring racks 702 using optical cables 704. For clarity, only the X and Y-direction cabling of the first row of racks 702 is shown in FIG. 7. However, each shuffle box 706 may also be connected to shuffle boxes 706 in the Z-direction. Additionally, each rack 702 may include a wrap-around cable (not shown) that connects the top shuffle box 706 in the rack 702 to the bottom shuffle box 706 in the rack 702, as described herein.

While the example data center arrangement 700 shown in FIG. 7 has 15 racks 702 with 5 racks 702 in each of the 3 rows, any number of racks 702 and/or rows otherwise consistent with the present disclosure may be used. Likewise, while each rack 702 is shown as having two shuffle boxes 706, each shuffle box being connected to twelve servers (not shown), any number of shuffle boxes 706 per rack 702, and any number of servers per shuffle box 706, otherwise consistent with the present disclosure is contemplated. The number of racks 702 and shuffle boxes 706 may be based on the dimensions of the 3D torus, the desired speed/bandwidth of the 3D torus, and the speed of individual ports/cables, among other considerations. For example, in some embodiments there may be 5280 servers arranged in a 22×24×10 configuration (e.g., with 22 racks in each row, 24 servers in each rack, and 10 rows in the data center). Accordingly, the application should not be limited to the example shown in FIG. 7.

Figure 8:
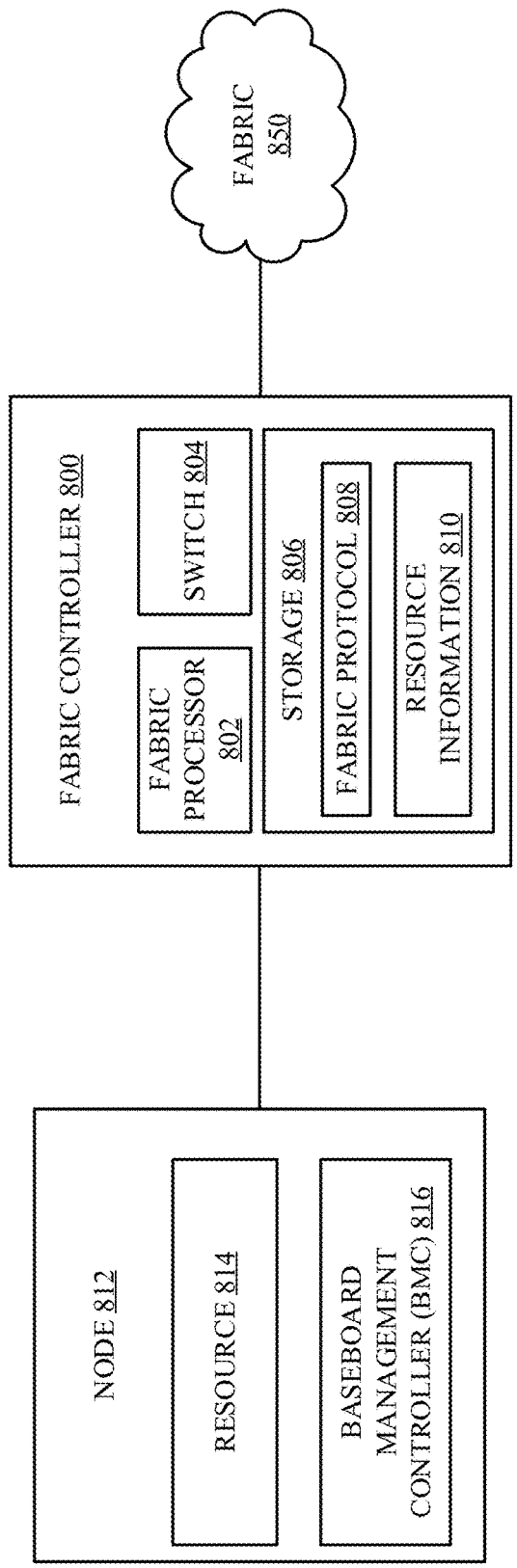
FIG. 8 illustrates a block diagram of an example paired fabric controller and node, in accordance with embodiments of the present disclosure.

Referring now to FIG. 8, illustrated are aspects of a fabric controller in accordance with some embodiments of the present disclosure. A plurality of fabric controllers can be connected to a plurality of nodes to form a fabric attached architecture in accordance with some embodiments of the present disclosure. Fabric controller 800 can be, but is not limited to, an embedded computer system, a system on chip (SoC), a system in package (SiP), a single-board computer (SBC), a computer-on-module (COM), or a system-on-module (SOM). In some embodiments, fabric controller 800 can be a Qseven module. Fabric controller 800 can contain fabric processor 802, switch 804, and storage 806.

Fabric processor 802 can be any one of numerous processors such as, but not limited to, a central processing unit (CPU), a multi-core processor, a front-end processor, a microprocessor, an application-specific instruction set processor (ASIP), an application-specific integrated circuit (ASIC), or a different kind of processor integrated into fabric controller 800 and capable of executing computer program instructions.

Switch 804 can be a switch configured to interconnect a plurality of nodes 812 (described in more detail below) together in a fabric 850. Switch 804 can be configured to selectively forward data to other switches associated with other fabric controllers interconnected in the fabric 850.

In various embodiments, switch 804 can include a plurality of Ethernet ports and/or a plurality of Peripheral Component Interconnect Express (PCIe) ports. In some embodiments, switch 804 is an Ethernet-based switch. In some embodiments, switch 804 is a single-host controller. In some embodiments, switch 804 is an Intel Ethernet Controller FM10000 Series product.

Storage 806 can be static or dynamic storage in various embodiments. In some embodiments, storage 806 is a flash storage. In some embodiments, storage 806 is a 16 gigabyte (GB) M4 flash storage.

Storage 806 stores fabric protocol 808 and resource information 810. Fabric protocol 808 comprises processor-executable instructions for fabric controller 800 to detect fabric 850, detect resource 814 associated with node 812, interface with resource 814 of node 812 via a baseboard management controller (BMC) 816, provide resource capability information associated with resource 814 to the fabric 850, and selectively forward data packets throughout the fabric attached architecture having virtual addresses defined by a virtualized data-link layer.

In some embodiments, storage 806 stores virtual address information for at least a portion of the fabric attached architecture in a ternary content addressable memory (TCAM). In some embodiments, the TCAM additionally contains physical addresses corresponding to six fabric controllers directly connected to fabric controller 800.

Resource information 810 provides processor-executable instructions for interfacing with node 812. Resource information 810 can contain any necessary firmware and/or software for interfacing with various families, types, generations, and/or versions of resources such that the fabric controller 800 can control the resource 814.

Storage 806 can receive software updates and/or firmware updates to fabric protocol 808 and/or resource information 810. As will be appreciated by one skilled in the art, individual fabric controllers can contain a standardized set of resource information 810, or individual fabric controllers can contain different sets of resource information 810 based on different types, families, generations, and/or versions of nodes that interface with respective fabric controllers.

Fabric controller 800 is communicatively coupled to a node 812. In some embodiments, fabric controller 800 and node 812 reside in a same sled of a rack (e.g., a same interchangeable unit in a server rack).

Node 812 contains resource 814 and BMC 816. Resource 814 can comprise, alone or in combination, storage resources, computational resources, processing resources, or other resources that can be utilized as virtual resources by the fabric 850. In some embodiments, resource 814 comprises only one of storage resources or computational resources.

BMC 816 can be a processor configured to monitor and interface with node 812 using one or more sensors (not shown) measuring variables relevant to performance such as, but not limited to, temperature, humidity, various power/voltage/current measurements, cooling parameters (e.g., fan speed), and/or communications parameters. In some embodiments, BMC 816 comprises a microcontroller embedded in a motherboard of node 812.

In some embodiments, node 812 is utilized according to instructions received from the fabric 850 via fabric controller 800. In some embodiments, BMC 816 is directly connected to fabric processor 802 via a RS-232 serial port communicating data according to the RS-232 serial communication transmission protocol. In some embodiments, BMC 816 is also connected to, or alternatively connected to, fabric controller 800 via a one gigabit Ethernet connection.

Fabric 850 can comprise a plurality of nodes 812. The plurality of nodes 812 can provide diverse capabilities to the fabric 850. In some embodiments, the nodes 812 comprise different resources (e.g., compute resources, storage resources, networking resources, etc.), different families of similar products (e.g., different brands of storage resources), and/or different generations of one product (e.g., legacy systems). Resource capability information can be provided to the fabric 850 by a fabric controller 800 associated with a node 812. Resource capability information can indicate performance characteristics (e.g., storage size, processing speed, etc.) available on each node 812. Fabric 850 can use resource capability information to utilize appropriate nodes 812 as virtual resources.

Fabric controller 800 can be embedded within, adjacent to, or distant from node 812 in various embodiments so long as fabric controller 800 is communicatively coupled to node 812 and fabric 850. In some embodiments, one fabric controller is associated with each node in the fabric 850 such that there are an equal number of fabric controllers and nodes. However, as will be appreciated by one skilled in the art, a plurality of fabric controllers could be distributed throughout the fabric attached architecture such that each fabric controller is associated with more than one node (e.g., each fabric controller associated with two nodes) while remaining within the spirit and scope of the present disclosure.

Although fabric controller 800 is shown including separate elements such as fabric processor 802, switch 804, and storage 806, fabric controller 800 can likewise have one or more of those separate elements integrated within one another or communicatively coupled to fabric controller 800 rather than embedded within the fabric controller 800. For example, fabric processor 802 could actually reside in switch 804. In another example, storage 806 could actually be communicatively coupled to fabric controller 800 rather than being embedded within fabric controller 800.

Figure 9A:
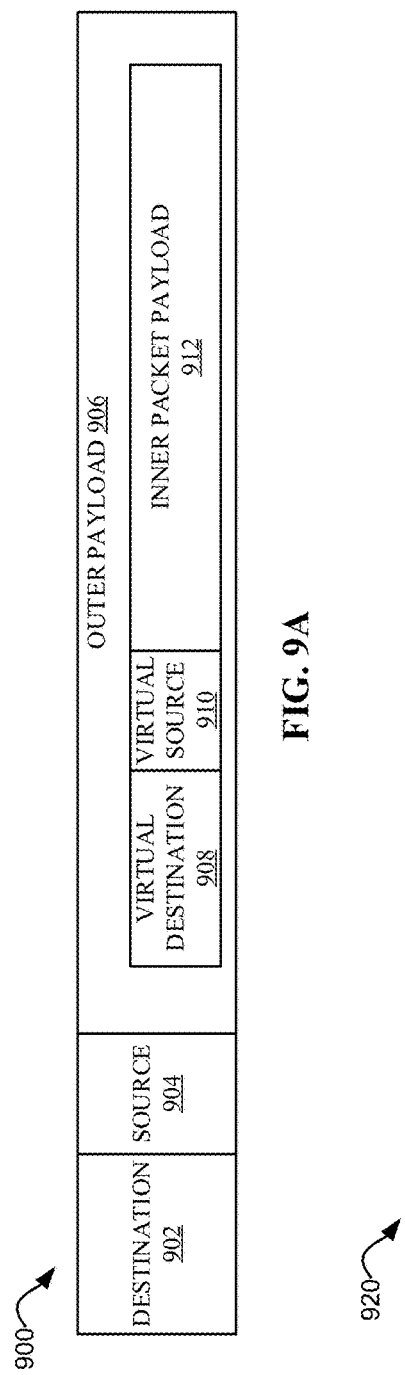
FIG. 9A illustrates a block diagram of an example data packet, in accordance with embodiments of the present disclosure.

Referring now to FIG. 9A, illustrated is an example data packet according to some embodiments of the present disclosure. Data packet 900 can contain a physical destination 902, a physical source 904, and an outer payload 906. Data packet 900 can further comprise a virtual destination 908, a virtual source 910, and an inner packet payload 912.

In some embodiments, physical destination 902 and physical source 904 are associated with a traditional data-link layer, and virtual destination 908 and virtual source 910 are associated with a virtualized data-link. Thus, virtual destination 908 and virtual source 910 can comprise virtual addresses assigned to a node and/or fabric controller as part of the virtualized data-link layer. In some embodiments, inner packet payload 912 can be associated with virtual machine information. In some embodiments, inner packet payload 912 contains layer 3 traffic (e.g., IPv4 or IPv6 traffic). In some embodiments, inner packet payload 912 is decapsulated at usage upon arriving at virtual destination 908.

Virtualized addresses can be created according to a data center identifier (ID), a rack ID, a chassis ID, and a fabric controller ID. Thus, each virtual address can be represented as a 4-tuple of data. In some embodiments, virtual addresses are represented in 48 bits. In some embodiments, virtual addresses are media access control (MAC) addresses or are similar to MAC addresses.

Data center IDs can include information such as, but not limited to, alone or in combination, a building, a room, a metropolitan area (e.g., MZone), a fault zone (e.g., FZone), and/or a quality of service (QoS) zone (e.g., QZone).

Rack IDs can include an identifier of a rack or enclosure containing a plurality of interchangeable sets of resources. In some embodiments, 9 bits of the virtual address are used to identify a rack ID.

Chassis IDs can include an identifier of a portion of a rack. In some embodiments, a chassis comprises a physically interchangeable unit of a rack. In some embodiments, chassis and sled are interchangeable terms. In some embodiments, 7 or fewer bits of the virtual address are used to identify a chassis ID.

Fabric controller IDs can identify a particular fabric controller in a chassis or sled of a rack.

Figure 9B:
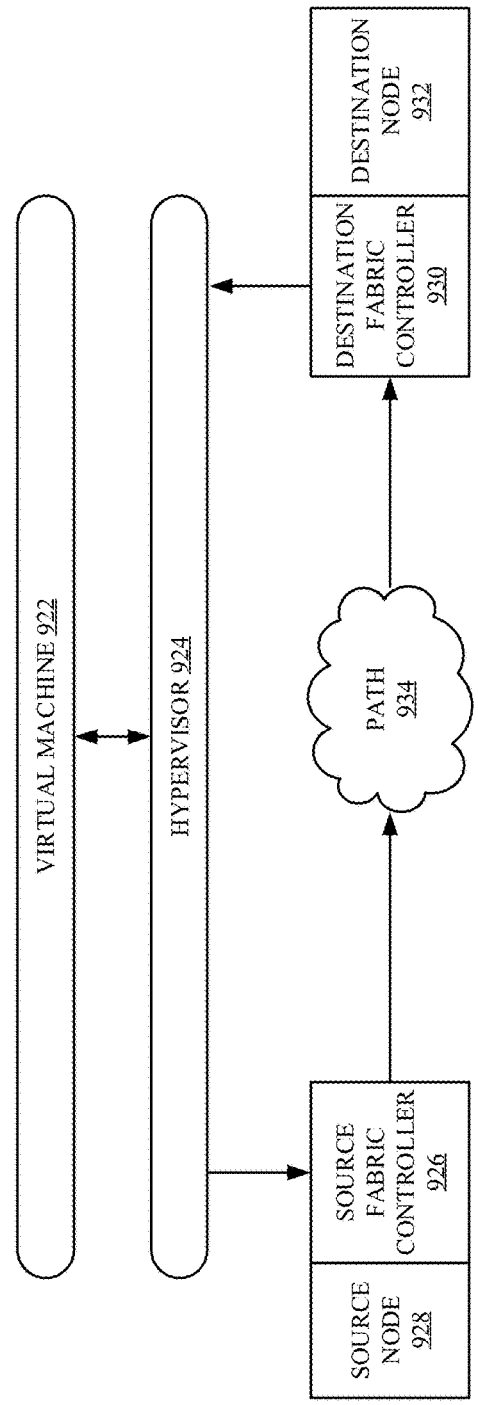
FIG. 9B illustrates an example data flow, in accordance with embodiments of the present disclosure.

Referring now to FIG. 9B, illustrated is an example data flow 920 according to some embodiments of the present disclosure. Data packet 900 can be generated by virtual machine 922 associated with hypervisor 924 and transmitted to a source fabric controller 926 associated with a source node 928. Source fabric controller 926 can identify virtual destination 908 associated with destination fabric controller 930 and identify at least a portion of an appropriate path 934 to destination fabric controller 930 based on logic stored in source fabric controller 926 (e.g., fabric protocol 808 of FIG. 8).

Appropriate path 934 can be determined based on iterative data packet switching or intelligent flow control logic. Data packet switching can be [−1,+1] path selection based on the virtual address of the fabric controller processing the traffic and the virtual address of the destination fabric controller 930 (e.g., each fabric controller can send the data packet to an adjacent fabric controller having a virtual address closer to the virtual address of the destination fabric controller 930 based on the 4-tuple of data associated with the virtual destination 908). In some embodiments, skip optimizations are utilized such that a more efficient route (e.g., a shorter, non-sequential route) is identified and utilized.

Destination fabric controller 930 receives data packet 900 and transmits data packet 900 to virtual machine 922 via hypervisor 924 together with any utilized resources associated with destination node 932 as indicated in inner packet payload 912.

Although the same virtual machine 922 and hypervisor 924 are described with respect to FIG. 9B, in some embodiments, data flows 920 may travel between different virtual machines and, in some cases, different hypervisors.

Figure 10:
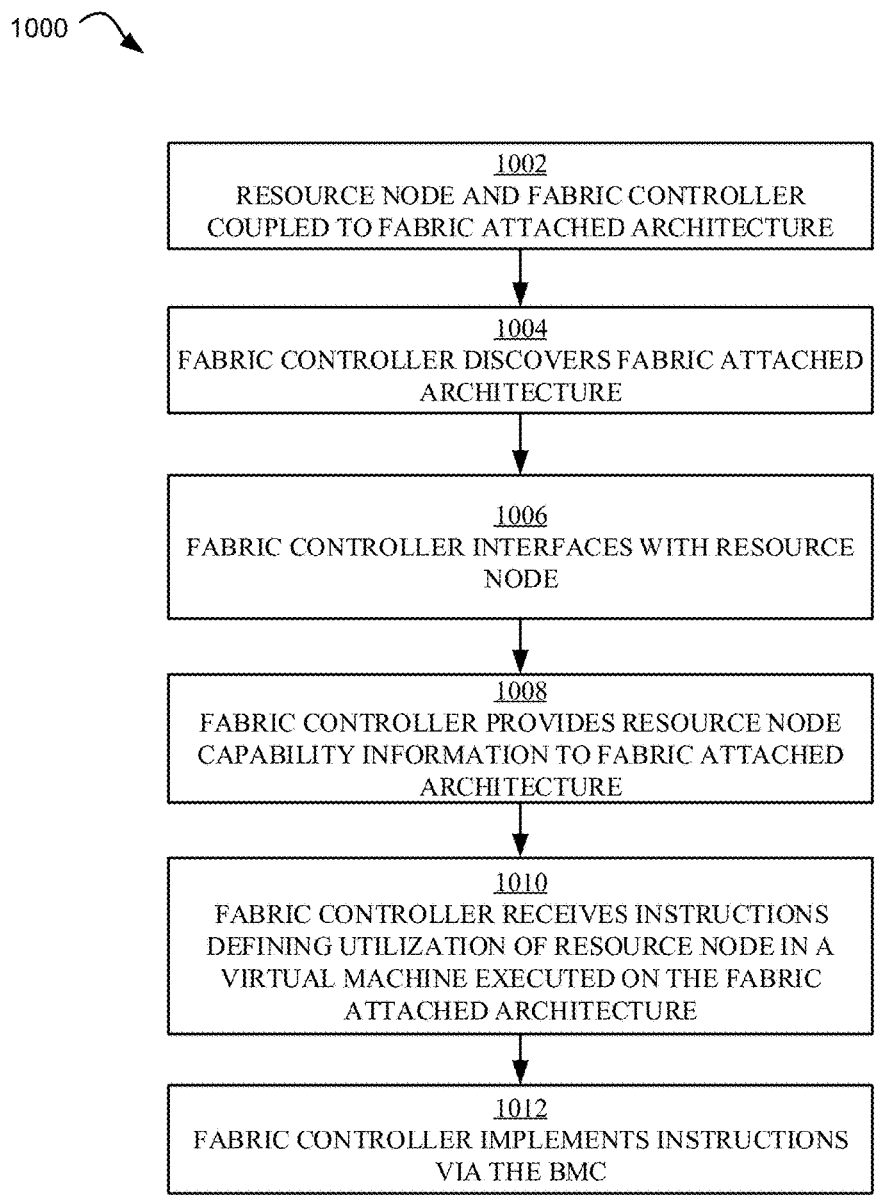
FIG. 10 illustrates an example flowchart for adding a node to a fabric attached architecture, in accordance with embodiments of the present disclosure.

Referring now to FIG. 10, illustrated is an example flowchart for adding a node to a fabric attached architecture in accordance with some embodiments of the present disclosure. In some embodiments, one or more operations of the method 1000 can be executed by a fabric controller (e.g., fabric controller 800 of FIG. 2) connected to at least one node (e.g., node 812 of FIG. 2). In some embodiments, one or more operations of the method 1000 are executed by a processor executing computer-readable instructions stored in a computer-readable storage medium. For consistency, the method 1000 will hereinafter be described as being executed by a fabric controller 800, however, as will be appreciated by one of skill in the art, alternative components or combinations of components can likewise perform aspects of the method 1000.

In operation 1002, a node 812 and an associated fabric controller 800 are coupled to a fabric attached architecture 850. In some embodiments, the node 812 and associated fabric controller 800 comprise a sled (e.g., an interchangeable unit of a rack). Operation 1002 can comprise physically connecting the node 812 and associated fabric controller 800 to the fabric attached architecture 850 (e.g., by Ethernet connection) and supplying power to the node 812 and associated fabric controller 800.

In some embodiments, the fabric attached architecture 850 comprises a plurality of nodes 812 directly and indirectly connected to one another via physical connections such as, but not limited to, Ethernet connections (e.g., optical Ethernet). In some embodiments, each node of the plurality of nodes are communicatively coupled to six other nodes in a torus topology using one or more shuffle boxes, with each connection comprising a 100 GBPS Ethernet connection such that each node exhibits internode connectivity speeds of approximately 600 GBPS. In some embodiments, respective nodes 812 in the fabric attached architecture 850 have compute capabilities, storage capabilities, networking capabilities, and/or other capabilities. In some embodiments, respective nodes 812 in the fabric attached architecture 850 have one and only one of storage capability or compute capability. In some embodiments, one fabric controller 800 is associated with each node 812. One of skill in the art will recognize alternative arrangements exist which fall within the spirit and scope of the present disclosure (e.g., two nodes 812 associated with each fabric controller 800).

In some embodiments, coupling the nodes 812 and the fabric controller 800 may include populating two or more shuffle boxes. Each of the two or more shuffle boxes may have a set of pigtails and a set of optical ports. As described herein, the set of pigtails may connect to two or more servers, and the set of connectors may communicatively couple shuffle boxes. Populating may include connecting the set of pigtails to the two or more servers, and communicatively coupling the two or more shuffle boxes using MPO cables and the set of optical ports.

In operation 1004, the fabric controller 800 discovers other fabric controllers and/or nodes in the fabric attached architecture 850 by executing instructions stored in a storage 806 (e.g., a flash memory) of the fabric controller 800 and via messages sent and/or received from a management entity associated with the fabric attached architecture 850. In some embodiments, fabric controller 800 discovers other nodes in the fabric attached architecture 850 using the Intermediate System-Intermediate System (IS-IS) protocol. In operation 1004, the fabric controller 800 receives any required information for successfully connecting its associated node 812 to the fabric attached architecture 850 such as, but not limited to, virtual addresses of other nodes in the fabric attached architecture. In some embodiments, operation 1004 comprises establishing virtual addresses in a virtualized data-link layer for the fabric controller 800 and its node 812.

In various embodiments, the fabric controller 800 and its node 812 are configured to have identical virtual addresses or virtual addresses that are sequential to one another. In some embodiments, fabric controller 800 retrieves a media access control (MAC) address from the BMC 816 and sets the MAC address of BMC 816 as the MAC address of the fabric controller 800. In some embodiments, the virtualized addresses are 48-bit addresses including 9 bits dedicated to identifying a rack and 7 or fewer bits dedicated to identifying at least a chassis or sled within the rack. In some embodiments, the virtualized addresses are configured to identify at least a data center, a rack, a chassis, and a fabric controller.

In operation 1004, the node 812 can successfully complete a power-on-self-test (POST) before entering a busy-wait status until instructions are received from the fabric controller 800. In some embodiments, the node 812 is not provided with sufficient software and/or firmware to fully boot without additional resources provided by the fabric controller 800 or without additional resources provided by the fabric attached architecture 850 and transmitted to the node 812 via the fabric controller 800. In some embodiments, the fabric controller 800 is provided with instructions stored in a storage 806 of the fabric controller 800 to prevent the node 812 from fully booting and/or detecting the fabric attached architecture 850 until allowed to do so by the fabric controller 800.

In operation 1006, the fabric controller 800 interfaces with the node 812. The fabric controller 800 can execute instructions, firmware, and/or software stored as resource information 810 in a storage 806 of the fabric controller 800 to successfully interface with the BMC 816 of the node 812. In some embodiments, the fabric controller 800 is configured to utilize the node 812 hardware such that the resources 814 (e.g., storage resources, computation resources, etc.) of the node 812 can be utilized in a virtual environment according to instructions sent from fabric controller 800 to node 812. Once the fabric controller 800 and the node 812 are appropriately configured to function in the fabric attached architecture 850, the node 812 is allowed to fully boot.

In operation 1008, the fabric controller 800 provides node capability information associated with its connected node 812 to the fabric attached architecture 850. Node capability information can be, but is not limited to, hardware capabilities (e.g., storage space and type of storage space, processing speed, etc.) associated with resources 814 on node 812. In some embodiments, the node capability information is provided to the fabric attached architecture 850 via a control plane of the fabric attached architecture 850. In some embodiments, the node capability information is collected and provided to the fabric attached architecture 850 based on instructions stored in fabric protocol 808.

In operation 1010, the fabric controller 800 receives instructions from the fabric attached architecture 850 for utilization of node 812 in a virtual environment, such as a virtual computing environment and/or virtual storage environment. The instructions received by the fabric controller 800 in operation 1010 can be received from, or associated with, a virtual machine, a hypervisor, or an administrator, such as a fabric manager.

In operation 1012, the fabric controller 800 implements the received utilization instructions by issuing instructions to its node 812, and the node 812 is utilized in a virtual environment.

Figure 11:
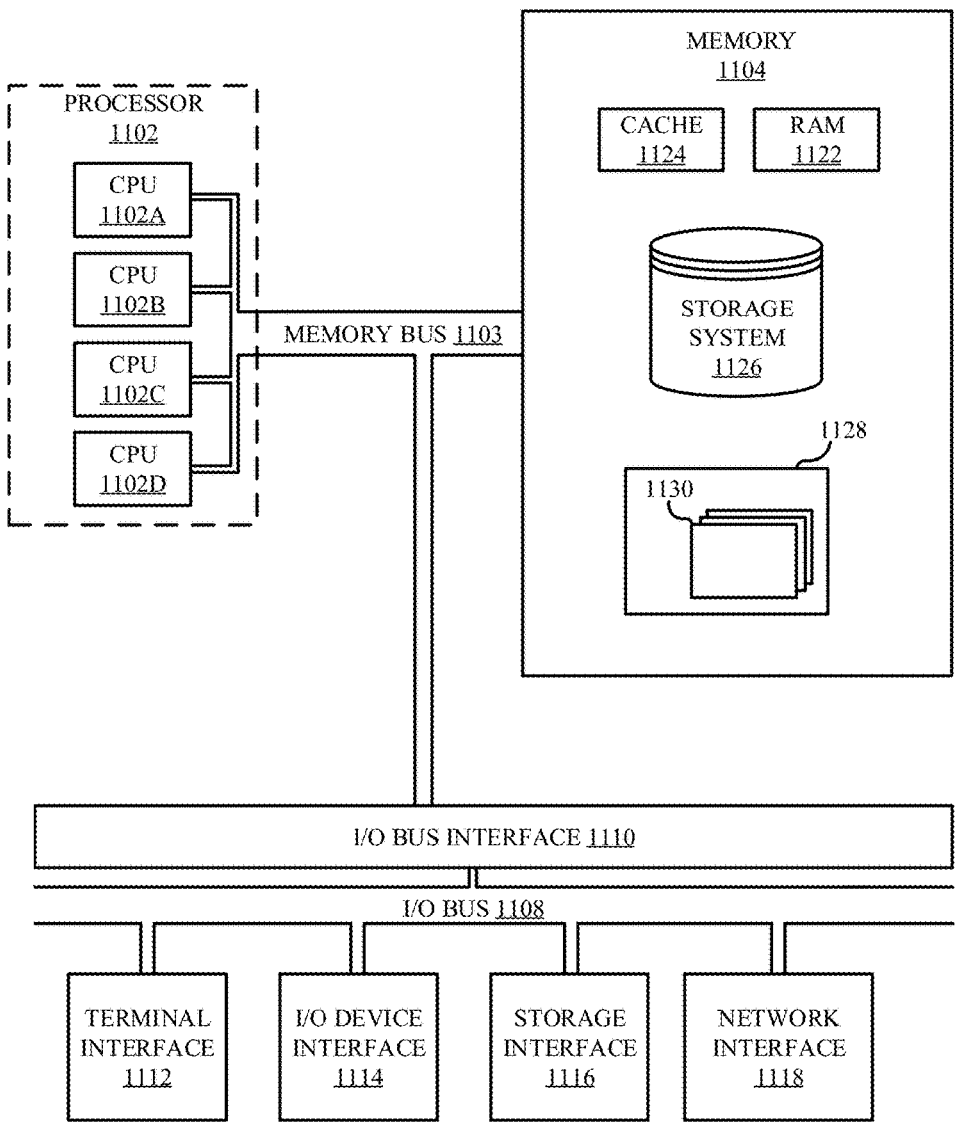
FIG. 11 illustrates a high-level block diagram of an example computer system that may be used in implementing one or more of the methods, tools, and modules, and any related functions, described herein, in accordance with embodiments of the present disclosure.

Referring now to FIG. 11, shown is a high-level block diagram of an example computer system 1101 (e.g., a node) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache.

System memory 1104 may include computer system readable media in the form of volatile memory, such as random access memory (RAM) 1122 or cache memory 1124. Computer system 1101 may further include other removable/non-removable, volatile/non-volatile computer system storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 1130 generally perform the functions or methodologies of various embodiments.

Although the memory bus 1103 is shown in FIG. 11 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single respective units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 11 is intended to depict the representative major components of an exemplary computer system 1101. In some embodiments, however, individual components may have greater or lesser complexity than as represented in FIG. 11, components other than or in addition to those shown in FIG. 11 may be present, and the number, type, and configuration of such components may vary.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
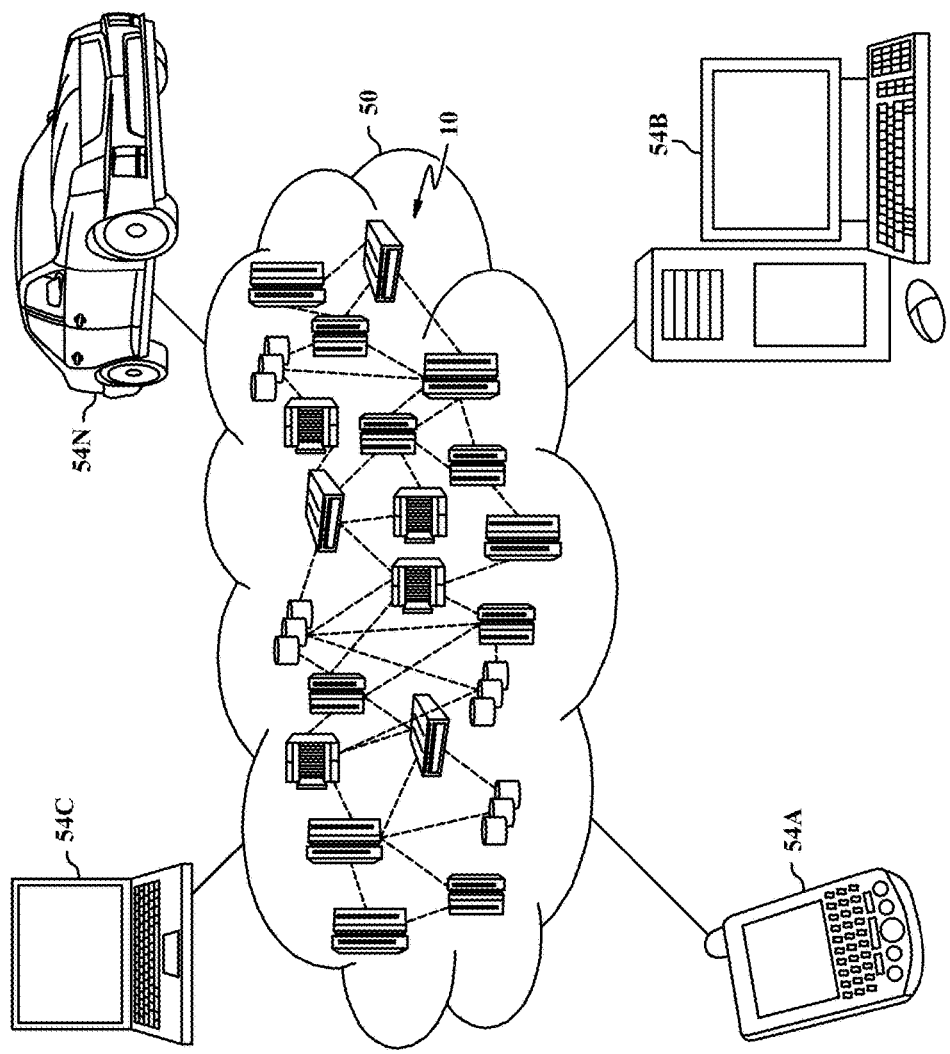
FIG. 12 depicts a cloud computing environment, in accordance with embodiments of the present disclosure.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
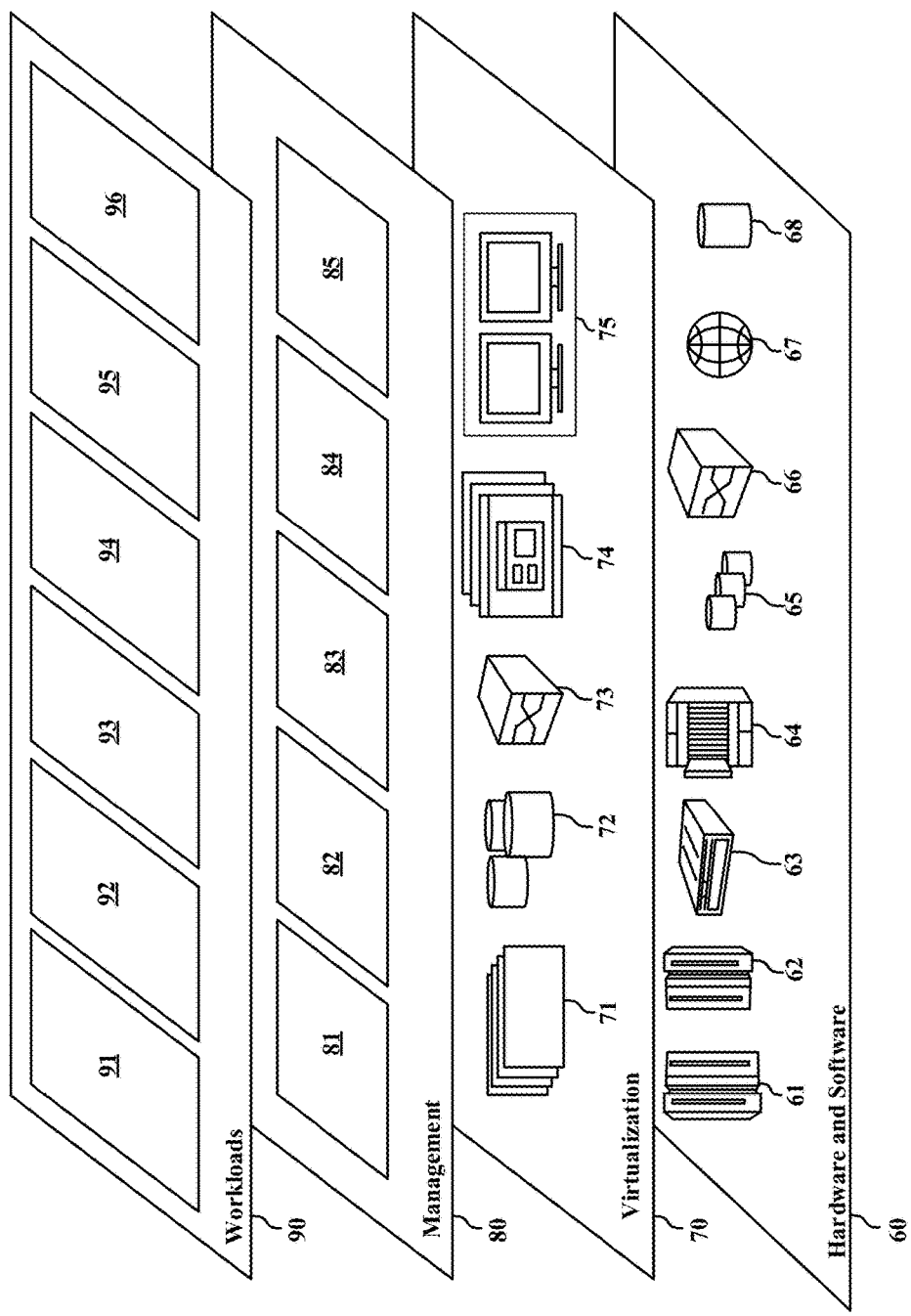
FIG. 13 depicts abstraction model layers, in accordance with embodiments of the present disclosure.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A shuffle box comprising:
a set of optical connector ports; and
a set of optical fiber pigtails, each optical pigtail having a first end and a second end, wherein the second end includes an optical connector,
wherein each optical connector port is communicatively coupled to the first end of two or more optical fiber pigtails.

2. The shuffle box of claim 1, wherein each optical fiber pigtail includes a plurality of optical fiber pairs, and wherein each optical connector port is communicatively coupled to a portion of the plurality of optical fiber pairs within the two or more optical fiber pigtails.

3. The shuffle box of claim 2, wherein at least two optical fiber pigtails share one or more optical fiber pairs.

4. The shuffle box of claim 1, wherein the set of optical connector ports includes a first subset of optical connector ports, a second subset of optical connector ports, and a third subset of optical connector ports, the first subset of optical connector ports corresponding to a first direction in a 3D torus fabric, the second subset of optical connector ports corresponding to a second direction in the 3D torus fabric, and the third subset of optical connector ports corresponding to a third direction in the 3D torus fabric,
wherein each optical fiber pigtail is connected to at least one optical connector port of the first subset of optical connector ports, and to at least one optical connector port of the second subset of optical connector ports.

5. A system comprising:
a first shuffle box; and
a second shuffle box, wherein each of the first and second shuffle boxes includes:
a set of optical connector ports; and
a set of optical fiber pigtails, each optical pigtail having a first end and a second end, wherein the second end includes an optical connector,
wherein each optical connector port is communicatively coupled to the first end of two or more optical fiber pigtails,
wherein the first shuffle box is communicatively coupled to the second shuffle box using a fiber optical cable.

6. The system of claim 5, wherein the fiber optical cable is connected to a first optical connector port of the first shuffle box at one end, and to a first optical connector port of the second shuffle box at an opposite end.

7. The system of claim 6, wherein the fiber optical cable is a multi-fiber push on (MPO) cable.

8. The system of claim 5, the system further comprising:
two or more nodes, the two or more nodes being communicatively coupled to the first shuffle box.

9. The system of claim 8, wherein each of the two or more nodes is connected to the first shuffle box using two or more pigtails, the optical connectors of the two or more pigtails being connected to each of the two or more nodes.

10. The system of claim 8, wherein the two or more nodes include at least one compute node and at least one storage node.

11. The system of claim 10, wherein the two or more nodes include a management entity, the management entity being configured to manage the at least one compute node.

12. The system of claim 5, wherein each optical fiber pigtail includes a plurality of optical fiber pairs, and wherein each optical connector port is communicatively coupled to a portion of the plurality of optical fiber pairs within the two or more optical fiber pigtails.

13. The system of claim 5, wherein at least two optical fiber pigtails share one or more optical fiber pairs.

14. The system of claim 5, the system further comprising:
a first set of nodes; and
a second set of nodes,
wherein each node of the first set of nodes is communicatively coupled with the first shuffle box using two or more optical fiber pigtails,
wherein each node of the second set of nodes is communicatively coupled with the second shuffle box using two or more optical fiber pigtails, and
wherein the fiber optical cable is connected to a first optical connector port of the first shuffle box at one end, and to a first optical connector port of the second shuffle box at an opposite end.

15. The system of claim 14, wherein the first shuffle box and the second shuffle box are connected such that the first and second sets of nodes are collectively arranged in a 3D torus topology.

16. A system comprising:
a plurality of shuffle boxes, each shuffle box having:
a set of optical connector ports;
a set of optical fiber pigtails, each optical fiber pigtail having a bundle of fibers at one end and an optical connector at an opposite end, each optical fiber pigtail being attached to one or more optical connector ports of the set of optical connector ports,
wherein each shuffle box is communicatively coupled with a plurality of nodes, each node being connected to a respective shuffle box using two or more optical fiber pigtails;
wherein each shuffle box is communicatively coupled to six other shuffle boxes.

17. The system of claim 16, wherein the plurality of shuffle boxes include a first shuffle box and a second shuffle box,
wherein the first shuffle box is communicatively coupled to the second shuffle box using two or more optical fiber cables.

18. The system of claim 17, wherein a first optical fiber cable connects a first optical connector port on the first shuffle box to a first optical connector port on the second shuffle box, and wherein a second optical fiber cable connects a second optical connector port on the first shuffle box to a second optical connector port on the second shuffle box.

19. The system of claim 16, wherein the plurality of shuffle boxes are connected in a 3D torus topology.

* * * * *